US010878195B2

(12) United States Patent
Duta

(10) Patent No.: US 10,878,195 B2
(45) Date of Patent: Dec. 29, 2020

(54) AUTOMATED EXTRACTION OF UNSTRUCTURED TABLES AND SEMANTIC INFORMATION FROM ARBITRARY DOCUMENTS

(71) Applicant: Microsoft Technology Licensing, LLC, Redmond, WA (US)

(72) Inventor: Nicolae Duta, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 251 days.

(21) Appl. No.: 15/970,511

(22) Filed: May 3, 2018

(65) Prior Publication Data

US 2019/0340240 A1 Nov. 7, 2019

(51) Int. Cl.
*G06F 40/30* (2020.01)
*G06F 40/177* (2020.01)
(Continued)

(52) U.S. Cl.
CPC .......... *G06F 40/30* (2020.01); *G06F 16/3344* (2019.01); *G06F 40/174* (2020.01);
(Continued)

(58) Field of Classification Search
CPC ...... G06F 40/177; G06F 40/30; G06F 40/103; G06F 40/131; G06F 40/163; G06F 40/10; G06F 16/3344
See application file for complete search history.

(56) References Cited

U.S. PATENT DOCUMENTS 5,956,422 A 9/1999 Alam
7,590,647 B2 9/2009 Srinivasan et al.
(Continued)

FOREIGN PATENT DOCUMENTS

WO 2013110289 A1 8/2013

OTHER PUBLICATIONS

Adelfio, Marco & Samet, Hanan, Schema extraction for tabular data on the web, Proceedings of the VLDB Endowment vol. 6, Apr. 2013, pp. 421-432 (Year: 2013).*
(Continued)

*Primary Examiner* — Ariel Mercado
(74) *Attorney, Agent, or Firm* — Alleman Hall Creasman & Tuttle LLP

(57) ABSTRACT

A "Table Extractor" provides various techniques for automatically delimiting and extracting tables from arbitrary documents. In various implementations, the Table extractor also generates functional relationships on those tables that are suitable for generating query responses via any of a variety of natural language processing techniques. In other words, the Table Extractor provides techniques for detecting and representing table information in a way suitable for information extraction. These techniques output relational functions on the table in the form of tuples constructed from automatically identified headers and labels and the relationships between those headers and labels and the contents of one or more cells of the table. These tuples are suitable for correlating natural language questions about a specific piece of information in the table with the rows, columns, and/or cells that contain that information.

20 Claims, 12 Drawing Sheets

Exemplary Table Generated by the "Table Extractor"

(51) Int. Cl.
  *G06K 9/00* (2006.01)
  *G06F 40/284* (2020.01)
  *G06F 16/33* (2019.01)
  *G06F 40/174* (2020.01)

(52) U.S. Cl.
  CPC .......... *G06F 40/177* (2020.01); *G06F 40/284* (2020.01); *G06K 9/00449* (2013.01); *G06K 9/00463* (2013.01); *G06K 2209/01* (2013.01)

(56) References Cited

U.S. PATENT DOCUMENTS

| | | | | |
|---|---|---|---|---|
| 8,214,733 | B2 | 7/2012 | Bastos Dos Santos et al. | |
| 9,286,290 | B2 | 3/2016 | Allen et al. | |
| 9,613,267 | B2 * | 4/2017 | Dejean | G06K 9/00449 |
| 9,665,770 | B2 | 5/2017 | Nanbu | |
| 9,703,759 | B2 | 7/2017 | Zaric et al. | |
| 9,734,181 | B2 | 8/2017 | Wang et al. | |
| 9,785,830 | B2 | 10/2017 | Hausmann et al. | |
| 9,798,711 | B2 * | 10/2017 | Dejean | G06F 40/117 |
| 10,127,444 | B1 * | 11/2018 | Burch | G06F 16/435 |
| 10,528,626 | B2 * | 1/2020 | Gregg | G06F 16/93 |
| 2004/0193520 | A1 | 9/2004 | Lacomb et al. | |
| 2008/0065671 | A1 | 3/2008 | Dejean et al. | |
| 2014/0122535 | A1 | 5/2014 | Gerard et al. | |
| 2016/0055376 | A1 | 2/2016 | Koduru | |
| 2017/0220858 | A1 | 8/2017 | Stitz et al. | |
| 2017/0329749 | A1 * | 11/2017 | Milward | G06F 40/14 |
| 2019/0171704 | A1 * | 6/2019 | Buisson | G06F 40/163 |

OTHER PUBLICATIONS

"International Search Report and Written Opinion Issued in PCT Patent Application No. PCT/US2019/029250", dated Sep. 10, 2019, 12 Pages.

Silva, et al., "Design of an End-to-End Method to Extract Information from Tables", In International Journal on Document Analysis and Recognition, vol. 8, Issue 2-3, Feb. 25, 2006, pp. 144-171.

"Bongo—Bangla Optical Character Recognition Software Manual", Retrieved from <<http://bcc.portal.gov.bd/sites/default/files/files/bcc.portal.gov.bd/page/e76a3c04_ad9b_4f43_927d_008a8ffde78e/Bongo%20OCR%20Software%20Manual.pdf>>, Nov. 8, 2017, 12 Pages.

"Tabula", Retrieved from <<http://tabula.technology/>>, Feb. 27, 2018, 4 Pages.

Shafait, et al., "Table Detection in Heterogeneous Documents", In Proceedings of 9th IAPR International Workshop on Document Analysis Systems, Jun. 9, 2010, pp. 65-72.

"PDFs, Cognitive Computing and Layout Analysis", Retrieved from <<https://pdf.zanran.com/hubfs/PDFs/PDFs&CognitiveComputingPaper.pdf?t=1493907802364>>, Retrieved Date: Apr. 1, 2018, 8 Pages.

* cited by examiner

The Odyssey

This is a summary of Odysseus journey as described in Homer's Odyssey.

| Odysseus' journey | Place | Story details |
|---|---|---|
| First stop (see Chapter 1) | Ismaros, Land of Cicones | Odysseus went to the The Land of Cicones for food and water. He ended up raiding the town, taking all the food, water, and gold. |
| Second stop (see Chapter 2) | The Island of the Lotus Eaters | The Lotus Eaters did not mean to cause any harm, they simply just wanted to treat their guests well. Odysseus realized that the men he sent have been gone for hours. |
| Third stop (see Chapter 3) | The Island of the Cyclopes | Polyphemus eats some of Odysseus' men and comes to blows with Odysseus himself. |
| Fourth stop (see Chapter 4) | Aeolia, the Island of Aeolus | Aeolus treated Odysseus hospitably and gave him a bag of winds. The bag had all of the west winds bundled up and was not to be opened until they get back to Ithaca. |

*Sample Table with Both Row and Column Labels, Title, and Summary Text in an Arbitrary Input Document*

FIG. 1

Row Headers (540)

The Odyssey

Column Headers (530)

This is a summary of Odysseus journey as described in Homer's Odyssey.

Rows (510) have different statistics

Label Column (550)

Columns (520) have different statistics

Table (500) generated by the Table Extractor

*Exemplary Table Generated by the "Table Extractor"*

FIG. 5

Columns (620) have different statistics

| Ismaros, Land of Cicones | Odysseus went to the The Land of Cicones for food and water. He ended up raiding the town, taking all the food, water, and gold. |
|---|---|
| The Island of the Lotus Eaters | The Lotus Eaters did not mean to cause any harm, they simply just wanted to treat their guests well. Odysseus realized that the men he sent have been gone for hours. |
| The Island of the Cyclopes | Polyphemus eats some of Odysseus' men and comes to blows with Odysseus himself. |
| Aeolia, the Island of Aeolus | Aeolus treated Odysseus hospitably and gave him a bag of winds. The bag had all of the west winds bundled up and was not to be opened until they get back to Ithaca. |

Rows (610) have similar statistics

Table (600) generated by the Table Extractor

*Exemplary Table having a Single Variable Relational Function*

FIG. 6

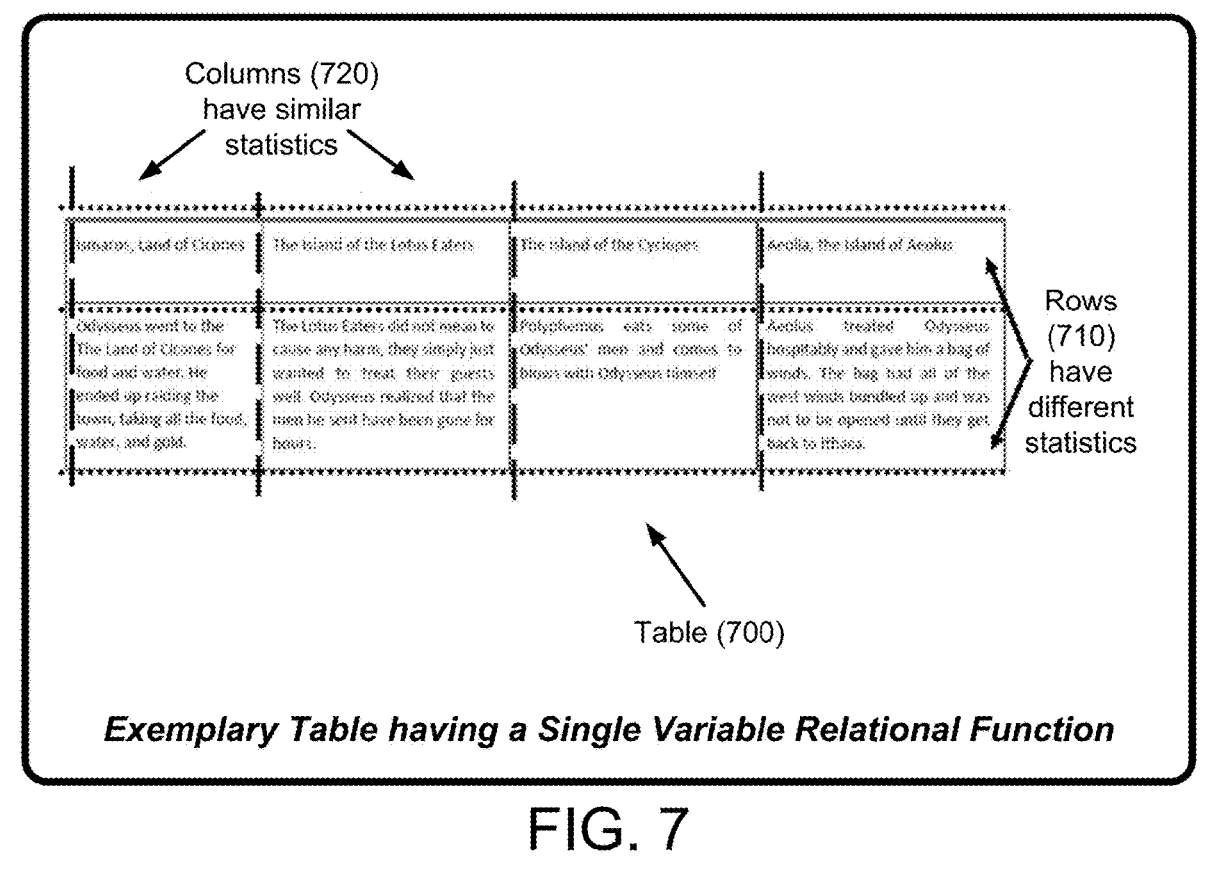

Columns (720) have similar statistics

Rows (710) have different statistics

Table (700)

Exemplary Table having a Single Variable Relational Function

FIG. 7

AUTOMATED EXTRACTION OF UNSTRUCTURED TABLES AND SEMANTIC INFORMATION FROM ARBITRARY DOCUMENTS

BACKGROUND

Many electronic documents, whether text or image-based, contain tables from which semantic information can be extracted. Unfortunately, many such documents are not structured in a way that facilitates automated extraction and use of the semantic information in combination with various natural language processing techniques. Further, the use of techniques such as, for example, optical character recognition (OCR), portable document format (PDF) to text conversion, etc., to process electronic documents containing tables do not typically return tables that are formatted in a way that facilitates natural-language processing operations on semantic relationships between informational elements of those tables.

SUMMARY

The following Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of other technologies may be discussed herein, the claimed subject matter is not intended to be limited to implementations that may solve or address any or all of the disadvantages of those other technologies. The sole purpose of this Summary is to present some concepts of the claimed subject matter in a simplified form as a prelude to the more detailed description that is presented below.

In general, a "Table Extractor" as described herein, provides various techniques for processing arbitrary documents containing tables to automatically detect and reconstruct those tables, and to generate labeled outputs, derived from the table contents that are suitable for information extraction and query processing via any of a variety of natural language processing (NLP) techniques.

More specifically, in various implementations, the Table Extractor receives an arbitrary document that is either fully or partially image-based (e.g., document scans, pictures, etc.), or that is comprised of machine-readable characters (including any combination of text, numbers, and special characters). In the case that the arbitrary document is fully or partially image-based, the Table Extractor applies existing OCR techniques to the document to generate machine-readable characters.

In various implementations, given these machine-readable characters, the Table Extractor applies a statistics-based unsupervised learning process to identify a plurality of table candidates based, in part, on tokens generated from the individual characters within the document and positions and alignments of those characters and tokens. The Table Extractor then ranks each of the table candidates from most to least likely to represent an actual table. These candidates are then evaluated in the ranked order until one is determined to represent an actual table or a decision is made that there is no table on the current page. This evaluation process also identifies table rows and columns that delimit table headers or labels and cells. Further processing of the actual table is performed to compute functional relationships on its contents. In general, the functional relationships provide tuples that are derived from automatically identified row and/or column headers or label columns and corresponding relationships between those headers or labels and the contents of one or more cells of the actual table.

For example, in various implementations, the Table Extractor begins operation on an arbitrary document by identifying each character in that document and a positional bounding box for each of those characters. Next, responsive to the character bounding boxes, the Table Extractor converts the identified characters into a plurality of tokens. In general, each of these tokens comprises a group one or more adjacent characters having approximately the same linear position within the document based on their bounding boxes. The Table Extractor then computes a plurality of joint vertical and horizontal alignments of the tokens. For each of these joint alignments, the Table Extractor then generates a corresponding table candidate.

In various implementations, the Table Extractor then selects one of the table candidates having a highest number of tokens. This selected table candidate is then segmented into a plurality of rows and a plurality of columns that jointly delimit a plurality of table cells, with each of those cells encompassing one or more corresponding tokens. The tokens in each cell are then converted into a text string based on the characters comprising each of those tokens. The Table Extractor then optionally determines whether a first column is a label column and identifies any combination of row headers and column headers of the selected table candidate. Given these headers and optional labels, the Table Extractor then identifies corresponding relationships between those headers or labels and the contents of one or more of the remaining cells.

These headers, labels and relationships are then processed by the Table Extractor to generate a set of tuples from text strings in corresponding cells of the selected table. In general, each of these tuples comprises one of the headers and, if present, a corresponding label, and functional relationships between those headers and labels and contents of corresponding cells of the table. These tuples may then be further processed using any a variety of NLP techniques to generate a response to a query on the selected table.

In various implementations, the original arbitrary documents received as input, in combination with some or all of the various information generated by the Table Extractor during the table identification process (e.g., character alignments and tokenization, token alignments, generation of table candidates, identification of row and/or column headers, generation of tuples, etc.) are provided as automatically generated labeled training examples for use with a variety of machine-learning processes. In general, these labeled training examples, optionally in combination with one or more hand-authored training examples, are provided as input to various machine-learning processes to learn one or more table extraction models or networks. In various implementations, the Table Extractor then applies one or more of these machine-learned models or networks to automate some or all of the steps for delimiting and extracting tables from arbitrary documents, and for generating text-based relational functions (e.g., the aforementioned tuples) on those tables. These text-based relational functions are then optionally processed via NLP-based techniques to extract semantic information for answering queries on the extracted tables.

The Table Extractor described herein provides various techniques for automatically delimiting and extracting tables from arbitrary documents, and then generating text-based relational functions on those tables that are suitable for generating query responses via any of a variety of NLP-based techniques. In addition to the benefits described above, other advantages of the Table Extractor will become apparent from the detailed description that follows hereinafter.

BRIEF DESCRIPTION OF THE DRAWINGS

The specific features, aspects, and advantages of the claimed subject matter will become better understood with regard to the following description, appended claims, and accompanying drawings where:

FIG. 1 illustrates an example of an arbitrary input document comprising a table with both row and column labels, title, and summary, and having a relational function that depends on both row and column variables, as described herein.

FIG. 5 provides an example of a table extracted by the Table Extractor from the sample table of FIG. 1, as described herein.

FIG. 6 provides an example of a table having a relational function of a single variable, as described herein.

FIG. 7 provides an example of a table having a relational function of a single variable, as described herein.

DETAILED DESCRIPTION

Figure 2:
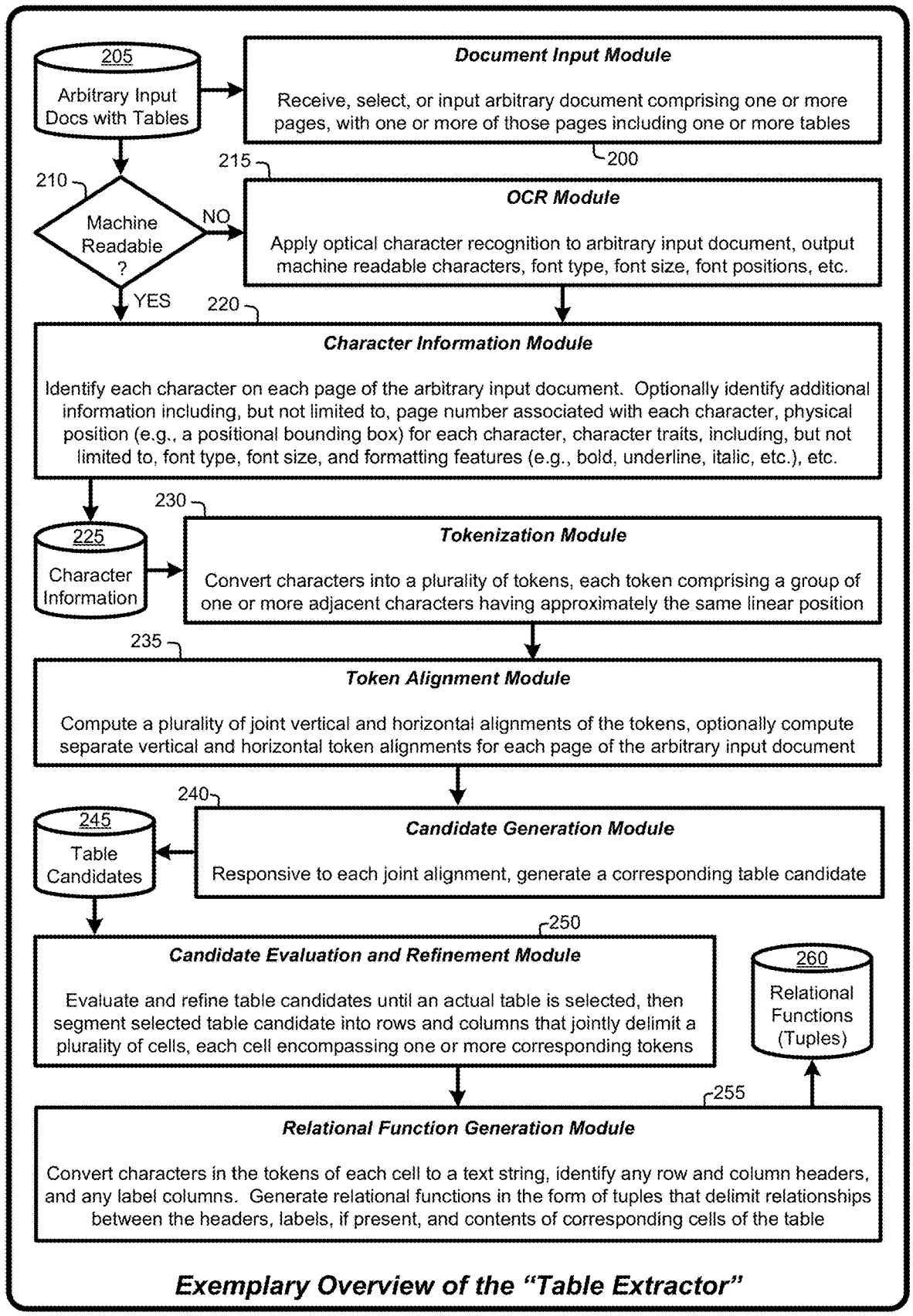
FIG. 2 provides an exemplary architectural flow diagram that illustrates program modules for effecting various implementations of a Table Extractor for automatically delimiting and extracting tables from arbitrary documents and generating relational functions on those tables, as described herein.

In the following description of various implementations of a "Table Extractor", reference is made to the accompanying drawings, which form a part hereof, and in which is shown by way of illustration specific implementations in which the Table Extractor may be practiced. Other implementations may be utilized and structural changes may be made without departing from the scope thereof.

Specific terminology will be resorted to in describing the various implementations described herein, and that it is not intended for these implementations to be limited to the specific terms so chosen. Furthermore, it is to be understood that each specific term includes all its technical equivalents that operate in a broadly similar manner to achieve a similar purpose. Reference herein to "one implementation," or "another implementation," or an "exemplary implementation," or an "alternate implementation" or similar phrases, means that a particular feature, a particular structure, or particular characteristics described in connection with the implementation can be included in at least one implementation of the Table Extractor. Further, the appearance of such phrases throughout the specification are not necessarily all referring to the same implementation, and separate or alternative implementations are not mutually exclusive of other implementations. The order described or illustrated herein for any process flows representing one or more implementations of the Table Extractor does not inherently indicate any requirement for the processes to be implemented in the order described or illustrated, and any such order described or illustrated herein for any process flows do not imply any limitations of the Table Extractor.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive in a manner similar to the term "comprising" as an open transition word without precluding any additional or other elements.

1.0 Introduction:

In general, a "Table Extractor" provides various techniques for automatically delimiting and extracting tables, and the characters within those tables, from arbitrary documents, and then generating relational functions on those tables. FIG. 1 illustrates an example of an arbitrary input document comprising a table 100 with a label column 110 and both row headers 115 and column headers 120, title 130, and summary 140. This sample table will be discussed with respect to various examples of the operation of the Table Extractor throughout this document. As described herein, the characters within these tables include any combination of handwritten and/or machine-generated text, numbers, and special characters. Advantageously, the relational functions generated by the Table Extractor are suitable for use in generating query responses on the table contents via any of a variety of NLP-based techniques. In other words, the text-based relational functions generated for tables produced by the Table Extractor may be optionally processed via NLP-based techniques to extract semantic information for answering queries on the extracted tables.

In other words, the Table Extractor provides various techniques for detecting and representing table information in a way suitable for information extraction. In various implementations, these techniques output relational functions on the table in the form of tuples constructed from automatically identified headers and labels, and functional relationships between those headers and labels and the contents of one or more cells of the table. These tuples are suitable for correlating natural language questions about a specific piece of information in the table with the rows, columns, and/or cells that contain that information.

As mentioned, the Table Extractor is capable of operating on arbitrary documents having any combination of handwritten characters and machine-generated characters (e.g., characters generated by printing devices, computers, typewriters, etc.). Advantageously, the Table Extractor operates identifies, delimits, and extracts tables, and relational information from those tables, without any requirement to consider existing table definitions, existing table lines that differentiate rows, columns, and/or cells, or any existing table metadata or the like within the document from which the table is extracted. However, if such information (e.g., definitions, lines, metadata, etc.) is available, in various implementations, the Table Extractor applies some or all of that information to further improve token alignments and table extraction processes.

1.1 System Overview:

As mentioned above, the Table Extractor provides various techniques for automatically delimiting and extracting tables from arbitrary documents, and then generating relational functions on those tables that are suitable for generating query responses via any of a variety of NLP-based techniques. The processes summarized above are illustrated by the general system diagram of FIG. 2. In particular, the system diagram of FIG. 2 illustrates the interrelationships between program modules for implementing various implementations of the Table Extractor, as described herein. Furthermore, while the system diagram of FIG. 2 illustrates a high-level view of various implementations of the Table Extractor, FIG. 2 is not intended to provide an exhaustive or complete illustration of every possible implementation of the Table Extractor as described throughout this document.

In addition, any boxes and interconnections between boxes that may be represented by broken or dashed lines in FIG. 2 represent alternate implementations of the Table Extractor described herein, and any or all of these alternate implementations, as described below, may be used in combination with other alternate implementations that are described throughout this document.

As illustrated by FIG. 2, in various implementations, the processes enabled by the Table Extractor begin operation by applying a Document Input Module 200 to receive, select, or otherwise input an arbitrary input document 205 comprising one or more pages, with one or more of those pages including one or more tables. Upon receipt of the arbitrary input document 205, the Table Extractor determines 210 whether or not the arbitrary input document is comprised of machine readable characters (including any combination of text, numbers, and special characters). If the arbitrary input document 205 does not provide machine readable characters, then the Table Extractor applies an OCR Module 215 to the arbitrary document 205 to generate an output of machine readable characters, and optionally, font type, font size, font positions, etc.

In either case, given the machine-readable character version of the arbitrary input document 205, the Table Extractor applies a Character Information Module 220 to identify character information 225 including each character on each page of the arbitrary input document. Optionally, the Character Information Module 220 also identifies additional character information including, but not limited to, page number associated with each character, physical position (e.g., a positional bounding box) for each character, character traits, including, but not limited to, font type, font size, and formatting features (e.g., bold, underline, italic, etc.), etc.

In various implementations, the Table Extractor then applies a Tokenization Module 230 to the character information 225 to convert or assign each of the characters on each page of the arbitrary input document 205 into a plurality of tokens. In general, each of these tokens comprises a group of one or more adjacent characters having approximately the same linear position. Next, given the tokenized characters, the Table Extractor applies a Token Alignment Module 235 to compute a plurality of joint vertical and horizontal alignments of the tokens. In various implementations, the Token Alignment Module 235 optionally computes separate vertical and horizontal token alignments for each page of the arbitrary input document 205.

Next, given the aforementioned token alignments, the Table Extractor applies a Candidate Generation Module 240 to generate a corresponding table candidate 245 for each of the joint vertical and horizontal alignments of the tokens. In various implementations, the Table Extractor then applies a Candidate Evaluation and Refinement Module 250 to the table candidates 245. In general, the Candidate Evaluation and Refinement Module 250 evaluates and refines a sorted list of table candidates until an actual table is selected. The Candidate Evaluation and Refinement Module 250 then segments the selected table candidate into rows and columns that jointly delimit a plurality of cells, each cell encompassing one or more corresponding tokens.

Following refinement and selection of one of the table candidates, a Relational Function Generation Module 255 is applied to convert characters in the tokens of each cell to a text string. The Relational Function Generation Module 255 then identifies row and column headers and any label column of the table. Further, the Relational Function Generation Module 255 generates functional relationships in the form of tuples 260 that delimit relationships between the headers, labels, if present, and text strings in corresponding table cells. In general, these tuples 260 represent text-based relational functions on the contents of the table that are suitable for generating query responses. As described herein these tuples 260 are then optionally provided as input to any of a wide variety of natural language processing techniques to answer user queries on the table.

2.0 Operational Details of the Table Extractor:

The above-described program modules and/or devices are employed for instantiating various implementations of the Table Extractor. As summarized above, the Table Extractor provides various techniques for automatically delimiting and extracting tables from arbitrary documents, and then generating text-based relational functions on those tables that are suitable for generating query responses via any of a variety of NLP-based techniques. The following sections provide a detailed discussion of the operation of various implementations of the Table Extractor, and of exemplary methods and techniques for implementing the features and program modules described in Section 1 with respect to FIG. 1 and FIG. 2. In particular, the following sections provides examples and operational details of various implementations of the Table Extractor, including:

An operational overview of the Table Extractor;
Documents suitable for processing by the Table Extractor;
Initial extraction of character information;
Character alignment operations;
Generation and alignment of tokens from the aligned characters;

Identification and evaluation of table candidates;
Identification of row and column headers and optional label columns;
Computing text-based relational functions on the table;
Generation of query responses based on the relational functions; and
Machine-learning based approaches to table extraction.

2.1 Operational Overview:

As mentioned above, the Table Extractor provides various techniques for automatically delimiting and extracting tables from arbitrary documents, and then generating text-based relational functions on those tables that are suitable for generating query responses via any of a variety of NLP-based techniques. The extracted tables can also be exported to other applications or used for any desired purpose.

In other words, in various implementations, the Table Extractor extracts tables from arbitrary documents by detecting and automatically segmenting tables into rows and columns that delimit cells of the table. In various implementations, table extraction is accomplished via a statistics-based unsupervised learning process that identifies multiple table candidates based, in part, on tokens generated from the individual characters within the document and positions and alignments of those tokens. In general, character alignment is used for producing tokens, and optionally determining whether particular characters are subscripts or superscripts, while token alignment is used for detecting and extracting tables.

Following selection of one of the table candidates, the Table Extractor provides various techniques to further processes the selected table candidate to identify any combination of row headers and column headers of the table along with an optional identification of a label column of the table. Given these headers and labels, the Table Extractor provides various techniques for generating text-based relational functions on those tables. In various implementations, these relational functions are used by the Table Extractor to generate an output of tuples from text strings in corresponding cells of the table. Each of these tuples delimits relationships between one of the headers, one of the labels, if present, and contents of a corresponding cell of the table. These tuples may then be further processed using any a variety of NLP-based techniques generate a response to a query on the selected table.

2.2 Documents Suitable for Processing by the Table Extractor:

In various implementations, the Table Extractor operates on arbitrary documents to perform table extraction and relational function generation operations. Such documents include, but are not limited to, image-based documents (e.g., a document photograph or scanned document) on which optical character recognition (OCR) operations may or may not have been performed, documents comprised of formatted machine-readable characters (including any combination of text, numbers, and special characters), and documents comprising any combination of image-based content, handwritten content, and machine-readable character content. Regardless of the document source or type, the Table Extractor processes the document using any combination of OCR, PDF-to-Text extraction, or any other image and text-based techniques to generate machine-readable characters (e.g., letters, numbers, special characters, emojis, etc.) in combination with at least the absolute and/or relative positions of those characters on particular pages within the arbitrary input document.

Advantageously, the Table Extractor achieves table extraction and relational function generation for either or both structured and unstructured tables regardless of whether or not such tables include lines, coloring, shading, or any other visible row, column, or cell delimiters. However, if such information (e.g., lines, coloring, shading, metadata, etc.) is available, in various implementations, the Table Extractor applies some or all of that information to further improve table extraction and relational function generation processes.

2.3 Initial Extraction of Character Information:

Following optional OCR operations on the arbitrary document, if necessary, the Table Extractor continues the table extraction process on a page-by page basis by generating an output of machine-readable characters on each page. Clearly, each page may include one or more tables, and one or more tables of the document may span more than one page. As such, in various implementations, the Table extractor maintains information as to page number from which the machine-readable characters are generated so that separate tables on individual pages or single tables spanning multiple pages are correctly extracted as individual tables. In addition, the Table Extractor records a physical position, e.g., a positional bounding box or the like for each character on each page. The Table Extractor also optionally records additional character traits, including, but not limited to, font type for each character (e.g., Arial, Calibri, etc.), font size for each character, and any of a variety of formatting features (e.g., bold, underline, italic, etc.) for each character.

For example, in various implementations, identification of the characters on one or more pages of a document comprises identifying an x-y bounding box for each character on a per-page basis. In particular, depending on page size, each page of an arbitrary document spans some dimensional range (e.g., points, pixels, inches, centimeters, etc.). As such, each individual character on a page can be delimited by a bounding box relative to the dimensional range of that page. In general, the bounding box may be configured in any desired shape. However, for purposes of discussion and explanation, a rectangular bounding box is assumed. As such, the bounding box for each character can be defined in a variety of ways. For example, the bounding box can be delimited by its four corners (e.g., $x_1,y_1$ through $x_4,y_4$). Alternately one corner coordinate with width and height relative to that point can be used to delimit each character bounding box. Similarly, a central coordinate and a range to left/right and top/bottom may be used to delimit each character bounding box. Other techniques for delimiting size and position of character bounding boxes may also be used.

Font size can be determined in a variety of ways. For example, font size information can be extracted from document metadata, if available. If such metadata in not available, font size can be determined via typical OCR-based techniques that determine font size as part of the overall recognition process. Alternatively, font size can be determined as a relative function by comparing sizes of character bonding boxes within the arbitrary document. Similarly, font sizes may be inferred directly from the size of the corresponding bounding box sizes for each character, optionally in relation to the page size. Such techniques for determining or inferring font size are known to those skilled in the art and will not be described in detail herein. However, the table extraction processes enabled by the Table Extractor are not dependent on explicit font size information. As such, explicit font size information is not used by the Table extractor if that information is not available.

With respect to font type, this information can be extracted from document metadata, if available. If such metadata in not available, font type is optionally obtained via existing font recognition techniques (e.g., OCR-based techniques) that compare document fonts to available system fonts to identify the fonts of the arbitrary document. Such techniques are known to those skilled in the art and will not be described in detail herein. However, the table extraction processes enabled by the Table Extractor are not dependent on font type information. As such, font type information is not used by the Table extractor if that information is not available.

With respect to font formatting features, this information can be extracted from document metadata, if available. If such metadata in not available, font formatting features (e.g., bold, underline, italic, etc.) for each character can be obtained via existing font recognition techniques (e.g., OCR-based techniques) that evaluate document font characteristics to identify font formatting features. Such techniques are known to those skilled in the art and will not be described in detail herein. However, the table extraction processes enabled by the Table Extractor are not dependent on font formatting feature information. As such, font formatting feature information is not used by the Table extractor if that information is not available.

2.4 Character Alignment Operations:

In various implementations, the Table Extractor processes the machine-readable characters generated from the arbitrary input document to align characters based on the bounding boxes associated with each character. The following discussion of character alignments assumes a left-to-right and top-to-bottom reading order, as is typical with the English language. With respect to other reading orders, the Table Extractor will make use of different alignment orders without departing from the scope of the ideas described herein. For example, Japanese text is typically presented in a format wherein the characters are written in columns going from top-to-bottom, with columns ordered from right-to-left. As such, in the case of tables generated in the Japanese language, the Table Extractor would align characters in manner consistent with the reading order for that language.

For example, assuming a left-to-right and top-to-bottom reading order, text in a table may not be exactly on the same horizontal line (e.g., same y-coordinates) on a page, depending on features such as, for example, font type, font size, subscripts and superscripts, text capitalization, table layout, whether or not the document is an image file that may have image warping or other image artifacts, etc. As such, in various implementations, the Table Extractor optionally preprocesses the characters on each page of the arbitrary input document to align slightly misaligned rows of characters based on y-coordinates of character bounding boxes.

In various implementations, the Table Extractor generates a sorted list (largest to smallest) of y coordinates of all character bounding boxes on a page. Then, given this information, for each y coordinate (e.g., possible line of text or characters) in the list of characters, if that y coordinate (including dimensions of the corresponding box) is close enough to the prior y coordinate (e.g., bounding box at least partially overlaps with the previous line) then the y coordinate of that character bounding box is mapped to the previous one (e.g., slightly move line of the bounding box up or down along the y-axis of the page to align with previous line). This process continues until all of the y coordinates of all characters in the page have been remapped (i.e., aligned) according to the mapping above. These remapped/aligned characters are then optionally sorted e.g., top to bottom and left to right.

Advantageously, this alignment process, in combination with bounding box sizes, is optionally applied by the Table Extractor to detect both subscripts and superscripts by identifying partially misaligned characters (e.g., smaller and partially overlapping or partially offset from the prior character) as representing subscripts or superscripts. These subscripts and superscripts are then aligned with the adjacent characters so that they become part of the same token (see tokenization discussion in Section 2.5 of this document). However, their original offset and size relative to the other characters is used to ensure that they remain subscripts or superscripts when the tokens are eventually converted back to characters and text strings as discussed in further detail herein.

Complex mathematics or other text may include multiple levels of subscripts and/or superscripts. The same general process for detecting size and partial overlaps relative to one or more adjacent characters enables the Table Extractor to identify these multi-level subscripts and superscripts and to ensure that they remain subscripts or superscripts when the tokens are converted back to text strings.

2.5 Generation and Alignment of Tokens from Aligned Characters:

In various implementations, the Table Extractor generates "tokens" from the optionally aligned characters on each page. In other words, assuming left-to-right and top-to-bottom reading order, each character is included in a particular token based on being on approximately the same horizontal line (or having the same vertical alignments) in combination with an evaluation of an amount of white space between adjacent characters on the same line. In various implementations, changes in character font size and/or capitalization are also considered to determine tokenization of characters. Following tokenization of the characters on each page, one or more of three types of token alignments is performed by the Table Extractor. These token alignments include vertical token alignments, horizontal token alignments, and a joint horizontal and vertical token alignment.

2.5.1 Tokenization of Characters:

A token is defined herein as set of consecutive characters on approximately the same horizontal line (or having the same vertical alignments) such that the distance (e.g., amount of whitespace) between any two consecutive characters is smaller than a given parameter (e.g., an adjustable range of whitespace, such as, for example, an equivalent of 2.5 white spaces based on character bounding box widths). Optionally, this definition of tokens is further limited by requiring all characters in a particular token to be roughly of the same size (although smaller subscripts/superscripts may also be included in a particular token).

In various implementations, the Table Extractor tokenizes characters on the same horizontal line (or having the same vertical alignments) based on the distance between consecutive characters or changes in font size (e.g., 2.5 white spaces). In other words, the Table Extractor converts the list of characters on a page into a list of tokens. The Table Extractor tracks the characters in each token, each token's page, physical position, and optionally the corresponding fonts, font sizes, and start/end indices in the original sorted character list. In addition, the Table Extractor sorts these tokens from top to bottom and left to right with respect to the corresponding page of the arbitrary document from which the tokens were generated.

2.5.2 Computing Vertical Token Alignments:

Following tokenization of the characters on a page, the Table Extractor computes vertical token alignments for each of those tokens. For example, in various implementations, for each x-coordinate on the page, the Table Extractor applies a vertical accumulator sampling window extending the length of the page (in the y-direction) and traversing the page along the x-axis (e.g., horizontal direction). In various implementations, this vertical accumulator sampling window has a fixed (e.g., 8 points, pixels, etc.) or adjustable width in the x-direction. This fixed or adjustable width is generally smaller than the width of the individual tokens (even in the case of single character tokens). As the vertical accumulator sampling window traverses the page in the x-direction, the Table Extractor maintains a count (e.g., number of votes) of the number of tokens (along the y-axis) that are touched by the accumulator sampling window at each position on the x-axis. In addition, the Table Extractor also optionally counts the number of characters within each token that are touched by the width of the vertical accumulator sampling window at each position on the x-axis.

The vertical accumulator (delimited by a succession of vertical accumulator sampling windows) can be considered as an array that is a full vector that covers the full page, and that is indexed by the x coordinates of the page. In other words, the vertical accumulator array provides a mechanism that shows x-positions on the page that have multiple votes (i.e., multiple tokens) within the width of each vertical accumulator sampling window. In various implementations, the width of the vertical accumulator sampling window may increase or decrease depending on factors such as, for example, size of page, number of points considered on the x-axis of the page, size of character bounding boxes, etc.

In general, tokens that are touched by the same vertical accumulator sampling window may not start in exactly the same x-position (e.g., left or right shifted relative to other tokens). In this case, the starting position of those tokens touched by the same vertical accumulator sampling window is optionally set (e.g., as any of an average, median, mode, etc.) of those tokens. In other words, tokens are horizontally aligned (for each accumulator sampling window at each position on the x-axis) based on being touched by the same vertical accumulator sampling window.

In various implementations, the Table Extractor determines a type of justification (e.g., left, right, or center) for a particular set of tokens by determining which type of alignment is a best fit for any particular vertical accumulator sampling window that touches that set of tokens. In other words, the Table Extractor steps a vertical accumulator across the x-axis of the page, counts the number of tokens at each step/position to determine number of "votes" for each accumulator position and then evaluates left and right token offsets in combination with token widths to determine the left, right, or center relative justification of those tokens.

2.5.3 Computing Horizontal Token Alignments:

Similar to the computation of vertical token alignments, the Table Extractor computes horizontal token alignments for each of the tokens on each page. For example, in various implementations, for each y-coordinate on the page, the Table Extractor applies a horizontal accumulator sampling window extending the width of the page (in the x-direction) and traversing the page along the y-axis (e.g., vertical direction). In various implementations, this horizontal accumulator sampling window has a fixed (e.g., 8 points, pixels, etc.) or adjustable width in the y-direction. This fixed or adjustable width is generally smaller than the height of the individual tokens (even in the case of single character tokens). As the horizontal accumulator sampling window traverses the page in the y-direction, the Table Extractor maintains a count (e.g., number of votes) of the number of tokens (along the y-axis) that are touched by the accumulator sampling window at each position on the y-axis. In addition, the Table Extractor also optionally counts the number of characters within each token that are touched by the width of the horizontal accumulator sampling window at each position on the y-axis.

The horizontal accumulator (delimited by a succession of horizontal accumulator sampling windows) can be considered as an array that is a full vector that covers the full page, and that is indexed by the y coordinates of the page. In other words, the horizontal accumulator array provides a mechanism that shows y-positions on the page that have multiple votes (i.e., multiple tokens) within the width of each horizontal accumulator sampling window. In various implementations, the width of the horizontal accumulator sampling window may increase or decrease depending on factors such as, for example, size of page, number of points considered on the x-axis of the page, size of character bounding boxes, etc.

In general, tokens that are touched by the same horizontal accumulator sampling window may not start in exactly the same y-position (e.g., shifted slightly up or down relative to other tokens). In this case, the starting position of those tokens touched by the same horizontal accumulator sampling window is optionally set (e.g., as any of an average, median, mode, etc.) of those tokens. In other words, tokens are vertically aligned (for each accumulator sampling window at each position on the y-axis) based on being touched by the same horizontal accumulator sampling window.

2.5.4 Computing Joint Vertical and Horizontal Token Alignments:

As a separate process from either the aforementioned horizontal token alignment or the aforementioned vertical token alignment, the Table Extractor also computes a joint vertical and horizontal token alignment. As discussed in Section 2.6 of this document, each of the individual joint vertical and horizontal token alignments are applied by the Table Extractor to identify physical extents of a corresponding table candidate for the corresponding page of the input document. Following optional refinement of the extents of one or more of these table candidates, an actual table will then be selected (e.g., extracted from the arbitrary input document) from among these table candidates.

In general, for every point on the page, the Table Extractor positions both a vertical and horizontal accumulator sampling window (individually similar to those described above) that cross at that point. Then, for each of those points, the Table Extractor counts the number of tokens that are touched by the vertical accumulator sampling window and the number of tokens that are touched by the horizontal sampling window. In the case that a token is touched by both the vertical and horizontal sampling windows, that token is counted for both the vertical and horizontal sampling windows. In various implementations, the Table Extractor then computes the product of the vertical and horizontal counts (e.g., 4 horizontal tokens multiplied by 20 vertical tokens equals a score of 80). In general, this product (e.g., 80) indicates a presumptive maximum number of tokens in a table that would be bounded by the extents of the corresponding vertical and horizontal sampling windows.

In the vertical direction (y-axis), the length of the vertical accumulator sampling window extends from approximately the top of the top token to approximately the bottom of the bottom token that is touched by that vertical accumulator sampling window. Similarly, in the horizontal direction (x-axis), the length of the horizontal accumulator sampling window extends from approximately the beginning of the leftmost token to approximately the end of the rightmost token that is touched by the horizontal accumulator sampling window. As such, the length of both the vertical and horizontal sampling windows changes depending on which tokens are touched by these sampling windows for any particular crossing point on the page.

In various implementations, the Table Extractor also optionally counts the number of characters within each of the tokens that are touched by the vertical accumulator sampling window and the number of characters within each of the tokens that are touched by the horizontal sampling window for each crossing point.

In various implementations, the Table Extractor then sorts or ranks the computed products (i.e., number of horizontal tokens multiplied by number vertical tokens at each crossing point) decreasingly (i.e., largest product to smallest product). In addition, in the event that two or more products for different crossing points are the same, then the products are further sorted, in decreasing order, based on most to fewest characters within the tokens touched by the corresponding vertical and horizontal accumulator windows.

2.6 Identification and Evaluation of Table Candidates:

In various implementations, the Table Extractor identifies a separate table candidate for each of the sorted or ranked computed products described in Section 2.5.4 of this document. In general, each table candidate is delimited by the lengths and positions of the corresponding vertical and horizontal accumulator sampling windows described in Section 2.5.4 of this document. Further, table candidates are refined and evaluated in order of most to least likely to represent an actual table based on the order of the sorted or ranked computed products. In other words, each table candidate represents an initial hypothesis for the extents of a possible table, with those extents being refined or adjusted while determining whether the hypothesis represents an actual table. As soon as one of the table candidates is determined to represent an actual table, with that determination also indicating the extents of the actual table, then the evaluation of table candidates terminates, and the actual table is output by the Table Extractor. However, the table extraction process may continue with respect to additional pages of the input document or with respect to additional tables on the same page.

For example, in various implementations, beginning with the highest ranked table candidate, the Table Extractor identifies a main horizontal row in the table candidate (i.e., the horizontal accumulator sampling window for the particular table candidate) and computes vertical column grids based on the tokens in that horizontal accumulator sampling window. The heights of these computed vertical column grids are not limited by the length of the corresponding vertical accumulator sampling window, but by the tokens as they relate to the individual vertical column grids.

More specifically, in various implementations, the main horizontal row corresponds to the horizontal accumulator sampling window of the corresponding table candidate. Further, each of the corresponding vertical column grids are delimited by the beginning (assuming left justification) of each of the separate tokens touched by that horizontal accumulator sampling window. In addition, the vertical column grids extend beyond the extents of the vertical accumulator sampling window of the table candidate. This extension of the vertical column grids enables detection of tokens corresponding to column headers that may not be aligned with the rest of the tokens in a particular column grid (e.g., centered headers above left justified table cells).

The Table Extractor then identifies first and last tokens belonging to the table candidate being evaluated. More specifically, one of the properties of tokens in columns is that any token in a column is presumed not to extend into either the previous or next column. As soon as this property is violated (e.g., a title that extends past the left or right extents of one or more columns) then the Table Extractor considers that token to be outside of the extents of an actual table. As discussed above, the Table Extractor keeps track of each token's position and sorts those tokens from top to bottom and left to right (assuming a left-to-right and top-to-bottom reading order). In addition, as discussed above, the Table Extractor also optionally tracks page number, font type, font size, and start/end indices in the original character list. This process enables detection of the first and last tokens in a table and refines the table candidate hypothesis to determine actual extents of the table for each candidate.

As such, the Table Extractor steps through the sorted list of tokens (both above and below the main horizontal row) until a first one of those tokens (both above and below) extends beyond any of the vertical column grids. In other words, the Table Extractor considers each token and determines whether it stays inside one of the vertical column grids. As long as the token stays inside one of the vertical column grids, then that token is still in the table, and the Table Extractor then considers the next token to determine if it is in the table, and so on. In general, the Table Extractor starts with bottom leftmost token of the main row and then goes up to determine possible upper extents of the column (e.g., uppermost token that doesn't violate left/right column extents), then moves across the table to tokens in the same line as the bottom leftmost token and goes down (in each possible vertical column grid) to determine lower extents of the table candidate. Further, the rightmost extents of the table candidate correspond to the rightmost extent of the token extending furthest to the right side of the table candidate.

Once the upper, lower, left and right extents of the table candidate have been determined as described above, the Table Extractor then further processes the table candidate to split and merge consecutive vertical column grids, if necessary, and to determine whether or not the table candidate is a valid table. For example, with respect to splitting and/or merging vertical column grids, potential errors in the tokenization process for any reason, such as, for example, an amount of whitespace between characters or empty table cells that may introduce missing or spurious vertical column grids that need to be split or merged.

In other words, the tokenization process may have errors. For example, what should be one token may be incorrectly broken into multiple adjacent tokens. Similarly, two or more tokens that should be separate tokens may be joined into a single token. Causes of this may be attributed to white spaces between words or characters, empty table cells, etc. In this case, the vertical column grids of the table candidate will be incorrect because these estimated vertical grids are based on horizontal separations between tokens.

Figure 3:
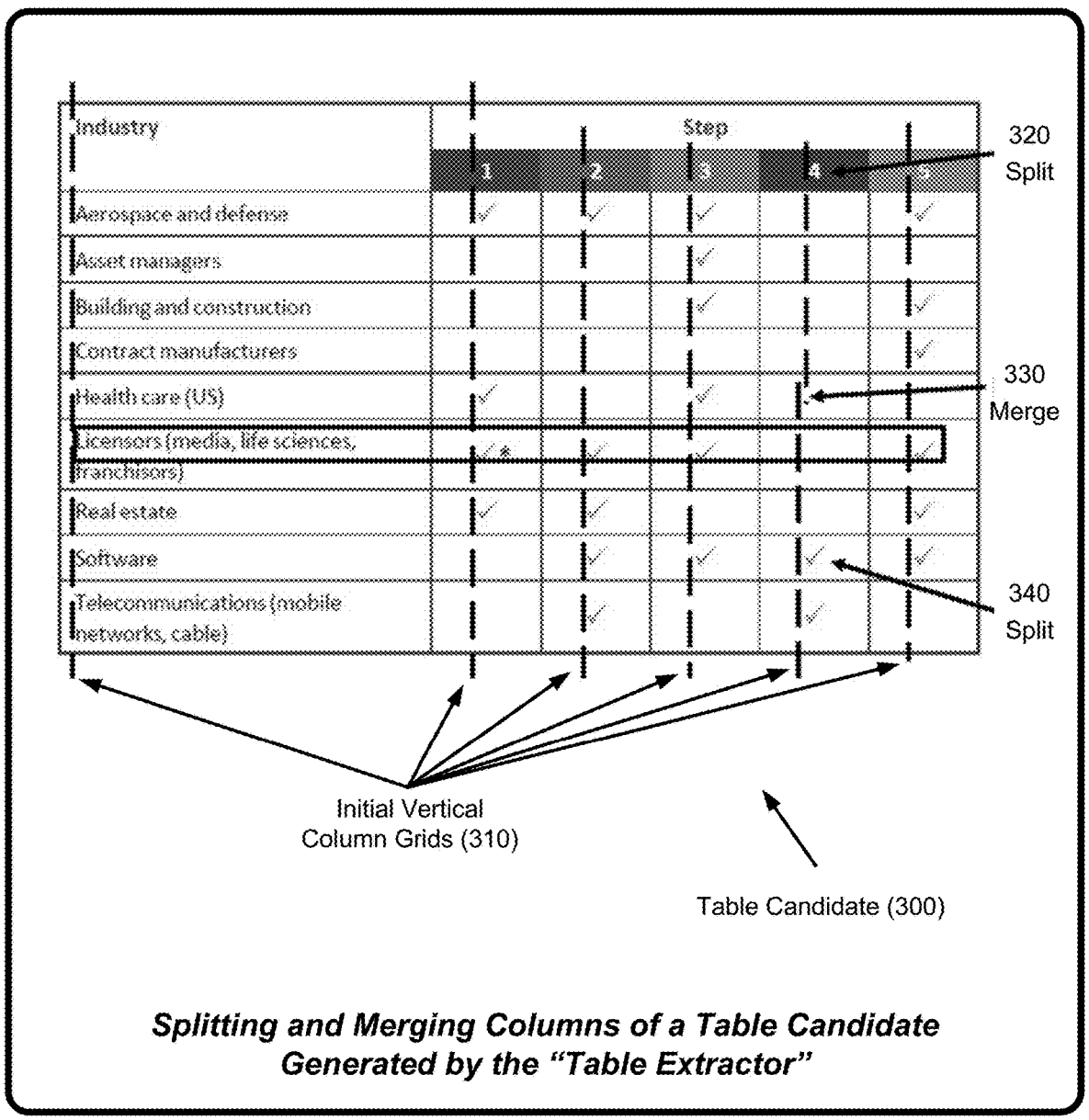
FIG. 3 provides an example of splitting and merging column grids of a table candidate generated by the Table Extractor, as described herein.

For example, FIG. 3, provides a table candidate 300 generated by the Table Extractor that illustrates an example wherein a column is split twice and then merged using the processes described herein. For example, element 320 shows a column split (see initial vertical column grids 310) to accommodate a token including the number "4" in the shaded row of FIG. 3. Similarly, element 340 shows a column split to accommodate a token including a check mark (i.e., "✓") below and slightly offset from the number "4". Since the tokens including the "4" and the check mark (i.e., "✓") below it do not align perfectly this results in a very thin spurious column which is then merged (330) with the column to the right such that the "4" and the check mark (i.e., "✓") are in the same column following that merge.

Next, the Table Extractor computes various statistics for the columns of the vertical column grids to look for places in those columns where the content changes. For example, in various implementations, for each column of the vertical column grid, the Table Extractor computes the number of tokens and an average token width, and then selects the column of the vertical column grid with most tokens and computes an inter-row distance histogram for that column. This computation enables the Table Extractor to identify rows of tokens belonging to the same cell, and horizontal positions in the vertical column grid where a new cell (e.g., a new table row) begins between rows of tokens. The resulting horizontal positions where new table rows begin are then applied to all of the columns of the vertical column grid in the table candidate.

More specifically, in various implementations, the Table Extractor looks for changes in statistics in the columns of the vertical column grid. For example, the Table Extractor computes the distance between consecutive rows of tokens and makes a histogram of these computations. Statistically, lines of tokens (e.g., text) within a single cell are closer together (e.g., vertical separation) than the distance between lines of tokens in cells above or below. In addition, in various implementations, the Table Extractor also considers changes between fonts in rows of tokens. For example, the font of a table header is generally different from the font of the cell contents with respect to issues such as capitalization, font size, text effects such as bolding, italics, etc. Another possible change that is considered between fonts in rows of tokens is that headers sometimes include text (possibly with numbers) while cell contents may include only numbers. Yet another possible change that is considered between fonts in rows of tokens is that, especially with text in cells, the first word in each cell is often capitalized. This is another clue as to cell separation that is considered by the Table Extractor. Advantageously, these statistics and considerations of possible changes between fonts in rows of tokens also aid in determining horizontal cell separators for the table candidate, as discussed below.

For example, in various implementations, the Table Extractor computes a horizontal grid of cell separators for the table candidate. In general, this horizontal grid is computed based on the statistics and the computed inter-row separations (i.e., computed distances between consecutive rows) described above to determine an initial horizontal grid of cell separators. The Table Extractor inserts horizontal grid lines between consecutive rows of tokens in the vertical column grid whenever the interrow distance is larger than the most frequent distance, or optionally, when the starting token begins with a capitalized character.

In addition, the Table Extractor considers clues from other vertical column grids to identify the horizontal grid of cell separators. For example, capitalization of a first token in a column (of the vertical column grid) may indicate new cell (i.e., a new row). More specifically, in various implementations, the Table Extractor applies the statistics from the vertical column having the most tokens to determine initial horizontal separators and then optionally refines or improves the initial horizontal separators by moving, adding, deleting, etc., one or more of horizontal separators based on clues from one or more of the other columns.

Next, given the vertical column grid and the horizontal grid of cell separators described above, the Table Extractor computes an initial cell content for the candidate table based on cells that are delimited by these vertical and horizontal grids. For example, in various implementations, the Table Extractor uses the vertical and horizontal grids to determine which tokens are in each of the cells delimited by those vertical and horizontal grids. The tokens in each cell are then converted back to machine readable characters (e.g., the string content of each cell comprising any combination of text, numbers, and special characters).

Next, as another optional step, the Table Extractor removes or merges rows of the horizontal grid of cell separators, if necessary, to remove tokens that are not associated with the table based on positions of tokens that appear to be outside of the cells of the table. For example, a row that appears to have a single column at the top or bottom of the table candidate may actually be associated with a table title, footer, etc., rather than cells of the table that contain table data. In various implementations, the Table Extractor performs the removal and/or merging process by first sorting cells bottom-up by y-coordinates, and then either merging the row of the horizontal grid of cell separators to the table row above or removing table rows with a single column of the vertical column grid.

It is possible that there may be a spurious horizontal cell separator grid line which is then removed. For example, if a horizontal grid line divides the table candidate in such a way that there is only one token associated with it, then it is likely to be invalid and is removed. In general, this process enforces logical consistency on the table candidate by ensuring that there are no columns with a single token or horizontal grid lines with a single token. In other words, this logical consistency ensures that there are no columns or rows that consist of a single non-empty cell.

Figure 4:
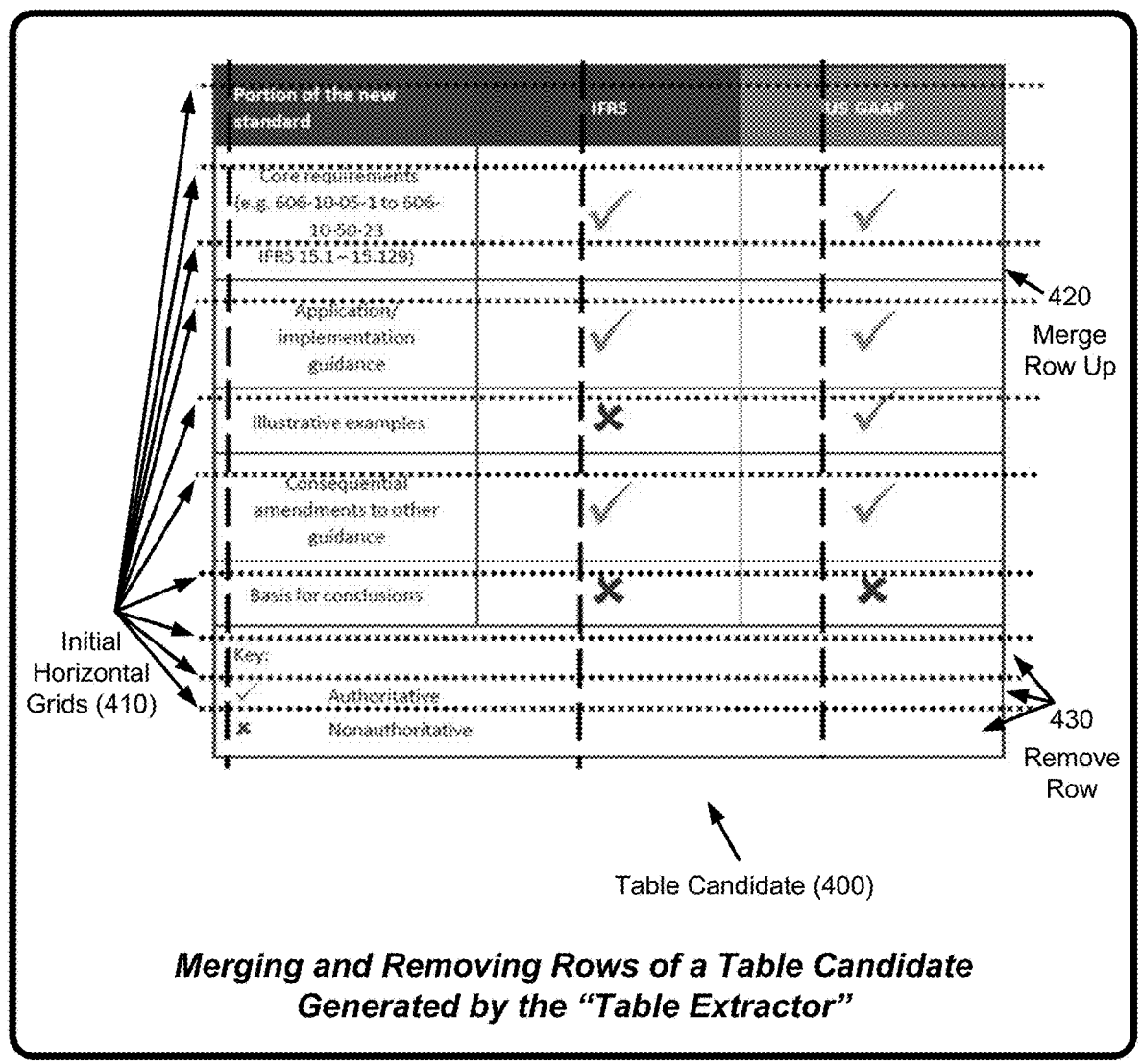
FIG. 4 provides an example of merging and removing row grids of a table candidate generated by the Table Extractor, as described herein.

For example, FIG. 4 provides a table candidate 400 generated by the Table Extractor that illustrates an example (based on initial horizontal grids 410) wherein a third row (from the top down) contains a single non-empty cell (i.e., characters in that token are "IFRS 15.1-15.129") in the first column. The initial horizontal grid for this row is initially generated by the Table Extractor because the corresponding token begins with a capitalized character. As such, because there is only a single non-empty cell in that row, the Table Extractor can either merge that third row with the row above or remove that third row. In this case, the Table Extractor applies the processes described herein to merge (420) the third row with the second row of the table candidate 400 because of the small distance to the token above in view of statistical differences in spacing or distance between tokens in the remainder of the table candidate. In addition, the bottom three rows of the table candidate 400 are removed, again based on the computed statistics, because the Table Extractor determines that those rows are not part of the table.

Next, as another optional step, the Table Extractor compute statistics from rows (and corresponding tokens) removed as described above. For example, if any interior tokens (e.g., tokens with the interior of the table candidate) were removed or there are columns with a single non-empty cell, then the Table Extractor rejects table hypothesis for the table candidate and moves to the next highest ranked table candidate. Otherwise, the Table Extractor determines that the candidate table, now delimited by the refined vertical and horizontal grids represents an actual table. In various implementations, this actual table is then further processed as described below in Section 2.7 of this document.

2.7 Identification of Row and Column Headers:

Given the refined vertical and horizontal grids described in Section 2.6 of this document, in various implementations, the Table Extractor determines whether the first column or the last column (based on the refined vertical column grid) of the actual table is a label column. In general, labels in tables typically appear within the first or last column of a table, but typically do not appear in the interior columns of the table. For example, if there is sufficient empty space between the first and the second columns (compared to the empty space between the following columns), then the Table Extractor identifies the first column as a label column. An example of such spacing is illustrated in FIG. 1 wherein label column 110 is separated from the next column to the right by a statistically large amount of white space.

In addition, the Table Extractor detects statistics changes between the first (or last) few rows and/or columns and the rest of the actual table to assist in determining whether or not a particular row or column includes headers. For example, if the first row of the actual table has a different font type, font size, formatting (e.g., bold, italic, etc.), number of characters, etc., then the Table Extractor identifies that row as a table header row. Similarly, if the first row of the actual table is text and the following rows are numbers (or vice versa), then the Table Extractor identifies that row as a table header row. Further, if the first row of the actual table has a different justification then the following rows, then the Table Extractor identifies that row as a table header row. In addition, any particular table may include headers for both the rows and columns, whether or not that table includes a two-variable function (e.g., a function of both arg1 and arg2, as discussed in further detail herein). If a table has both row and column headers then it represents a 2-variable function. In contrast, when the Table Extractor detects only row headers or column headers, but not both, the resulting table represents a 1-variable function. As such, if the Table Extractor detects a label column on the left side, then the Table Extractor also checks the next column to the right to determine whether that column includes headers (e.g., headers 115 as illustrated by FIG. 1. In addition, two or more adjacent rows may be part of a compound header (e.g., first row includes a single cell with the word "Step" and the following row includes 5 cells with the numbers "1" through "5") that can be combined by the Table Extractor to form a single header. In this example, the Table extractor generates headers "Step 1" through "Step 5" as five separate headers in place of the two separate header rows.

For example, FIG. 5 provides an example of a case where a table 500 generated by the Table Extractor includes rows 510 having sufficiently different statistics (e.g., bold font, number of characters in cells, spacing, etc.) to indicate that the first row is a header row relative to the second row of the table. In addition, differences in statistics of a particular column (520) or row (510) may also be compared to statistics of individual cells. For example, statistics computed for the first column in a table can be compared to statistics for computed for the last (e.g., bottom right) cell in the table. Similarly, table 500 also includes columns having sufficiently different statistics (e.g., separation distance between the rest of the cells and inclusion of non-letter characters in cells) to indicate that the first column 550 is a label column relative to the one or more other columns of the table. In addition, the table 500 also includes row headers 540 in a header column, and column headers 530 in a header row. Then, each of the remaining cells in the table 500 represent content that is functionally related to one or more of the identified row and column headers.

Similarly, FIG. 6 provides an example of a case where a table 600 generated by the Table Extractor includes rows 610 having sufficiently similar statistics (e.g., number of characters in cells) to indicate that the first row is not a header row relative to the second row of the table. In contrast, this table 600 includes columns 620 having sufficiently different statistics (e.g., number of characters in cells, white space after characters, etc.) to indicate that the first column is a header column relative to the second column of the table. Then, each of the corresponding cells in subsequent columns of the table 600 represent functions of those arguments of the corresponding text-based relational function. For example, if there is a header column, then each cell in that column provides a separate header for a corresponding row. Similarly, if there is a header row, then each cell in that row provides a separate header for a corresponding column.

Similarly, FIG. 7 provides an example of a case where a table 700 generated by the Table Extractor includes rows 710 having sufficiently different statistics (e.g., number of characters in cells, spacing between lines of characters, etc.) to indicate that the first row is a header row relative to the second row of the table. In contrast, this table 700 includes columns 720 having sufficiently similar statistics (e.g., number of characters in cells, white space after characters, etc.) to indicate that the first column is not a header column relative to the second column of the table. As such, each cell of the header row provides a separate header for each corresponding column.

Given the determination of row and/or column labels or headers for the actual table, the Table Extractor next computes relational functions on the table as described in Section 2.8 of this document.

2.8 Computing Relational Functions on the Table:

In various implementations, the Table Extractor computes relational functions of the table by applying the row and/or column headers and, optionally, any label columns, to generate a set of possible tuples from text strings in corresponding cells of the selected table. In general, each of the individual text strings of each header in any cell of any header row or header column provides an "argument" of a corresponding tuple. The remaining table cells corresponding to those headers (e.g., cells in the same row or column as a particular cell having a header) then represents content that is functionally related to one of those headers. Advantageously, the identification of relationships between headers, optional labels, and cell contents is determined by the Table Extractor without any requirement to perform any language-based processing or understanding of the text strings in any of the cells of the actual table.

In general, the relationships between headers, optional labels, and cell contents are delimited by tuples that encode each possible combination of labels and headers and cell contents supported by the layout of the actual table. Further, these tuples are formatted in a way that is suitable for use as inputs to answer questions by applying NLP-based techniques to a combination of a user query or question and the set of tuples returned by the Table Extractor.

For example, in the case where the actual table includes a table header as a first column, and a table header as a first row, and where table associations are left to right and top to bottom, the Table Extractor applies a relational function where all tuples are of the form [arg1| arg2 | f(arg1, arg2) | label | page], and wherein this tuple form is applied to generate each possible combination of functional relations between headers and cell contents.

In general, the term "arg1" (i.e., "argument 1") refers to a corresponding header generated from a header column, if there is one in the table. In the case where the table also includes a header row in addition to the header column, then each of a plurality of "arg1" terms is generated from a combination of the contents of the first cell in the header column and the content in each subsequent cell of the header column. Similarly, the term "arg2" (i.e., "argument 2")

refers to a corresponding header generated from a header row, if there is one in the table. The "f(arg1, arg2)" term represents a functional relation between "arg1" and "arg2", and is given by the contents of the cell corresponding to "arg1" and "arg2". The optional "label" term in the tuple form is simply the corresponding label, while the optional "page" term in the tuple form is simply the corresponding page of the document from which the table was extracted.

For example, considering the table illustrated by FIG. 5, using the above-described tuple form based on the table, the Table Extractor produces a set of tuples including, but not limited to the following:

Tuple 1a: [Odysseus' journey First stop (see Chapter 1) | Place | Ismaros, Land of Cicones | 000:005 Odyssey | Page 1]

Tuple2a: [Odysseus' journey First stop (see Chapter 1) | Story details Odysseus went to . . . | 000:005 Odyssey | Page 1]

Tuple 3a: [Odysseus' journey Second stop (see Chapter 2) | Place | The Island of the Lotus Eaters| 006:010 Odyssey | Page 1]

For example, in "Tuple 1a" above, "arg1" is given by a combination of headers in the header column to produce "Odysseus' journey First stop (see Chapter 1)". In this case, "arg2" for Tuple 1a (i.e., "Place") is given by the next header of the header row. Further, the functional relation in Tuple 1a (i.e., the "f(arg1, arg2)" term) represents a functional relation between "arg1" and "arg2" and is given by the contents of the cell corresponding to those two arguments, i.e., "Ismaros, Land of Cicones". The corresponding "label" term of Tuple 1a is "000:005 Odyssey". Finally, the optional "page" term in this example is "Page 1" since the original document from which the table was extracted consists of a single page for purpose of this example.

In the case where the actual table includes a header column as a first column, but no row headers, and where table associations are left to right, the Table Extractor applies the same tuple form and simply omits missing terms. For example, considering the table illustrated by FIG. 6, in the case where the table includes a header column (e.g., "arg1") but does not include a header row (e.g., "arg2"), the Table Extractor produces a set of tuples that omits the "arg2" term and since there is no label column, it also omits the label term. The resulting tuples include, but are not limited to the following:

Tuple 1b: [arg1=Ismaros, Land of Cicones || f(arg1) =Odysseus went to the The Land of Cicones for . . . || Page 1]

Tuple 2b: [arg1=The Island of the Lotus Eaters || f(arg1) =The Lotus Eaters did not mean . . . || Page 1]

Similarly, in the case where the actual table includes a header row as a first row, but no column headers, and where table associations are top to bottom, the Table Extractor again applies the same tuple form and simply omits missing terms. For example, considering the table illustrated by FIG. 7, using this tuple form, the Table Extractor produces a set of tuples including, but not limited to the following:

Tuple 1c: [Ismaros, Land of Cicones || Odysseus went to the The Land of Cicones for . . . || Page 1]

Tuple 2c: [The Island of the Lotus Eaters || The Lotus Eaters did not mean . . . || Page 1]

2.9 Generation of Query Responses:

As mentioned, in various implementations, the Table Extractor generates relational functions in the form of tuples that are suitable for use in answering questions by applying NLP-based techniques to a combination of the query or question, one or more the tuples and corresponding informational elements of the table (e.g., corresponding cell contents). For example, by matching words or phrases in a natural language question (e.g., Question: "What was the place of Odysseus' first stop?") to words or phrases comprising arguments of a table relational function (e.g., Tuple: [Odysseus' journey First stop (see Chapter 1) | Place | Ismaros, Land of Cicones | 000:005 Odyssey 1 Page 1]), an answer (e.g., Answer: "Ismaros, Land of Cicones" according to "000:005 Odyssey" see "Page 1") may be provided in response to the user query.

In various implementations, the Table Extractor applies various NLP techniques to these tuples and the information contained within the table to generate natural language response to queries or questions on the table content. Advantageously, the labeled data provided by these tuples enables a variety of additional applications that result in the technical effect of improving user efficiency through automated responsive access to relevant information derived from tables that have been automatically extracted from arbitrary documents.

For example, in various implementations, the Table Extractor provides any combination of an NLP-based query system, a structured language query system, or a search-engine based query system for interacting with and retrieving information from extracted tables as a direct function of the automatically identified relational functions derived from those tables. In various implementations, the Table Extractor provides a user interface that receives any combination of user inputs including, but not limited to, written inputs (via real or virtual keyboard and/or pointing device-based inputs), spoken inputs, gestural inputs, or other NUI-based inputs, to request, retrieve, and/or search information from within the automatically extracted tables based on the relational functions of the aforementioned tuples.

The relational functions of the aforementioned tuples generally represent a text-based mapping that delimits relationships between the headers, labels, if present, and contents of corresponding cells of the table. As such, the set of tuples generated for each table can be understood as forming a structured database of tuples that is suitable for processing via any of a variety of NLP-based techniques to answer user queries. For example, in various implementations, the Table Extractor applies any of a wide range of query techniques, such as NLP-based techniques, search-engine-based techniques, etc., to direct questions at the structured data base, as illustrated by FIG. 8.

Figure 8:
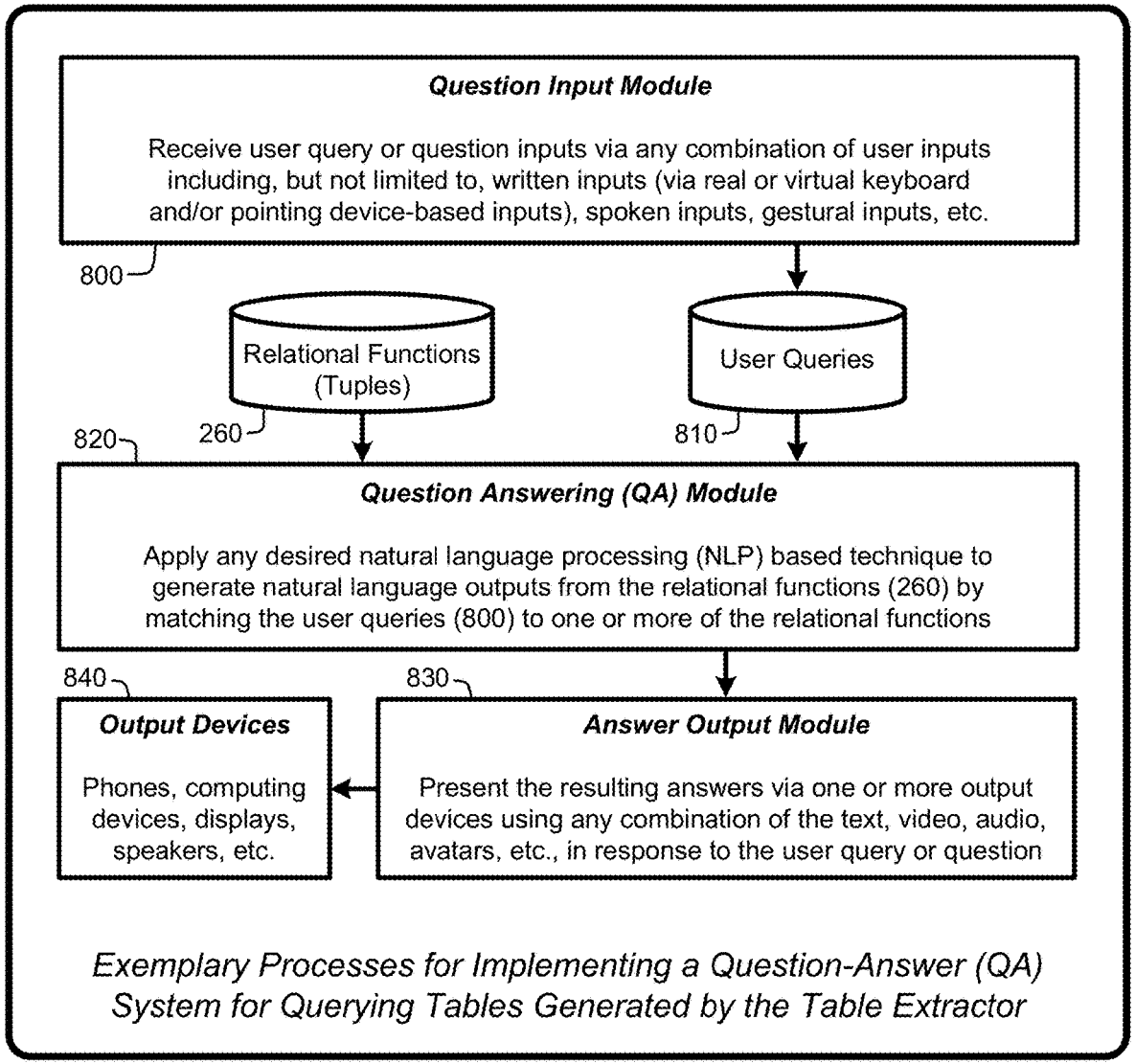
FIG. 8 provides an exemplary architectural flow diagram that illustrates program modules showing various exemplary processes for using question-answer (QA) processes to query tables via relational functions generated by the Table Extractor, as described herein.

FIG. 8 is not intended to be an exhaustive representation of all of the various implementations of the Table Extractor described herein, and the implementations represented in FIG. 8 are provided only for purposes of explanation. Further, it should be noted that any boxes and interconnections between boxes that are represented by broken or dashed lines in FIG. 8 represent optional or alternate implementations of the Table Extractor described herein, and that any or all of these optional or alternate implementations, as described below, may be used in combination with other alternate implementations that are described throughout this document.

In various implementations, as illustrated by FIG. 8, the Table Extractor applies a Question Input Module 800 to receive user query 810 or question inputs via any combination of user inputs including, but not limited to, written inputs (via real or virtual keyboard and/or pointing device-based inputs), spoken inputs, gestural inputs, or any other input mechanism. In various implementations, a Question Answering (QA) module 820 then applies any desired NLP-based technique to provide an answer by matching the user query or question to one or more of the set of relational functions (tuples) 260. Similarly, the QA Module 820 may also apply various NLP-based techniques to consider the user query 810 in combination with the relational functions (tuples) 260 in combination with corresponding text strings from one or more cells of the table to generate an output an answer. In various implementations, the answer generated by the QA Module 820 is generated in a natural language format (e.g., one or more natural language words, phrases, or sentences).

In various implementations, an Answer Output Module 830 then presents the resulting answers via one or more output devices 840. The answer output module 830 applies any combination of output techniques (e.g., text, video, audio, avatars, etc.) to output the answers in response to the user query 810 or question. As such, this means that in various implementations, the Table Extractor provides a QA capability into a free-flowing dialog system centered on table headers and corresponding content derived from tables that are automatically extracted from arbitrary documents.

2.10 Machine-Learning Based Approaches to Table Extraction:

In various implementations, the Table Extractor makes use of a deep convolution network (or other machine-learning model) that applies supervised learning to mimic the behavior of the unsupervised table extraction processes described in Sections 2.1 through 2.9 of this document. For example, in various implementations, the Table Extractor generates a machine-learned model or network that is trained on the original input documents from which tables were extracted, in combination with the outputs from each of the various steps described above. As discussed, these steps include, but are not limited to initial extraction of character information; character alignment operations; generation and alignment of tokens from the aligned characters; identification and evaluation of table candidates; identification of row and column headers and optional label columns; and computing text-based relational functions on the table (e.g., tuples). Similarly, in various implementations, the Table Extractor generates a machine-learned model or network trained on any combination of the inputs and outputs of the above-described steps (e.g., extraction of character information; character alignment; alignment of tokens, etc.) in further combination with optional human quality scores or the like for any of the outputs of those steps. In various implementations, the Table Extractor then applies one or more of the resulting models to perform some or all of the different steps of the overall table extraction and tuple generation processes described herein.

Figure 9:
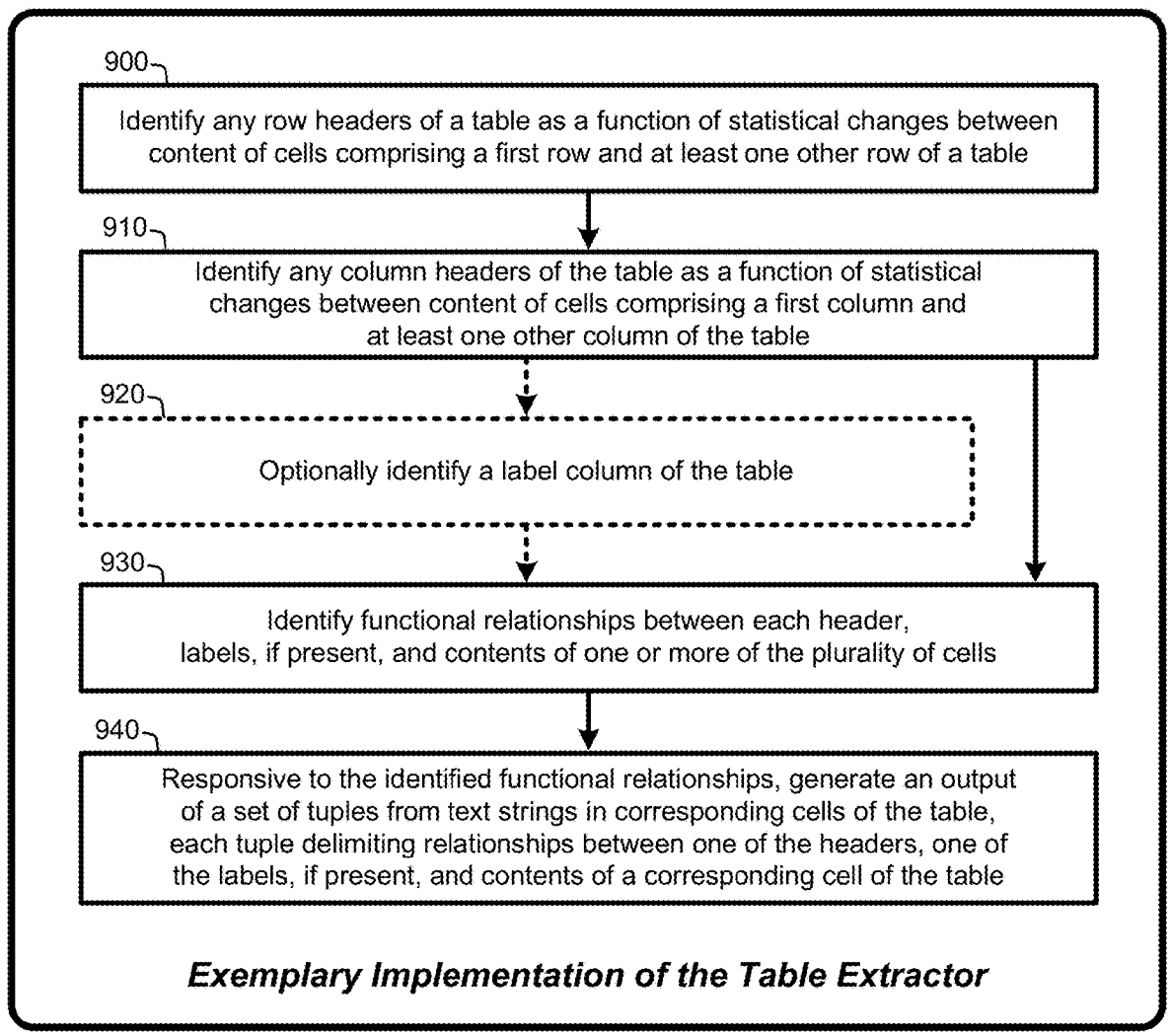
FIG. 9 illustrates a general system flow diagram that illustrates exemplary techniques for effecting various implementations of the Table Extractor, as described herein.
Figure 10:
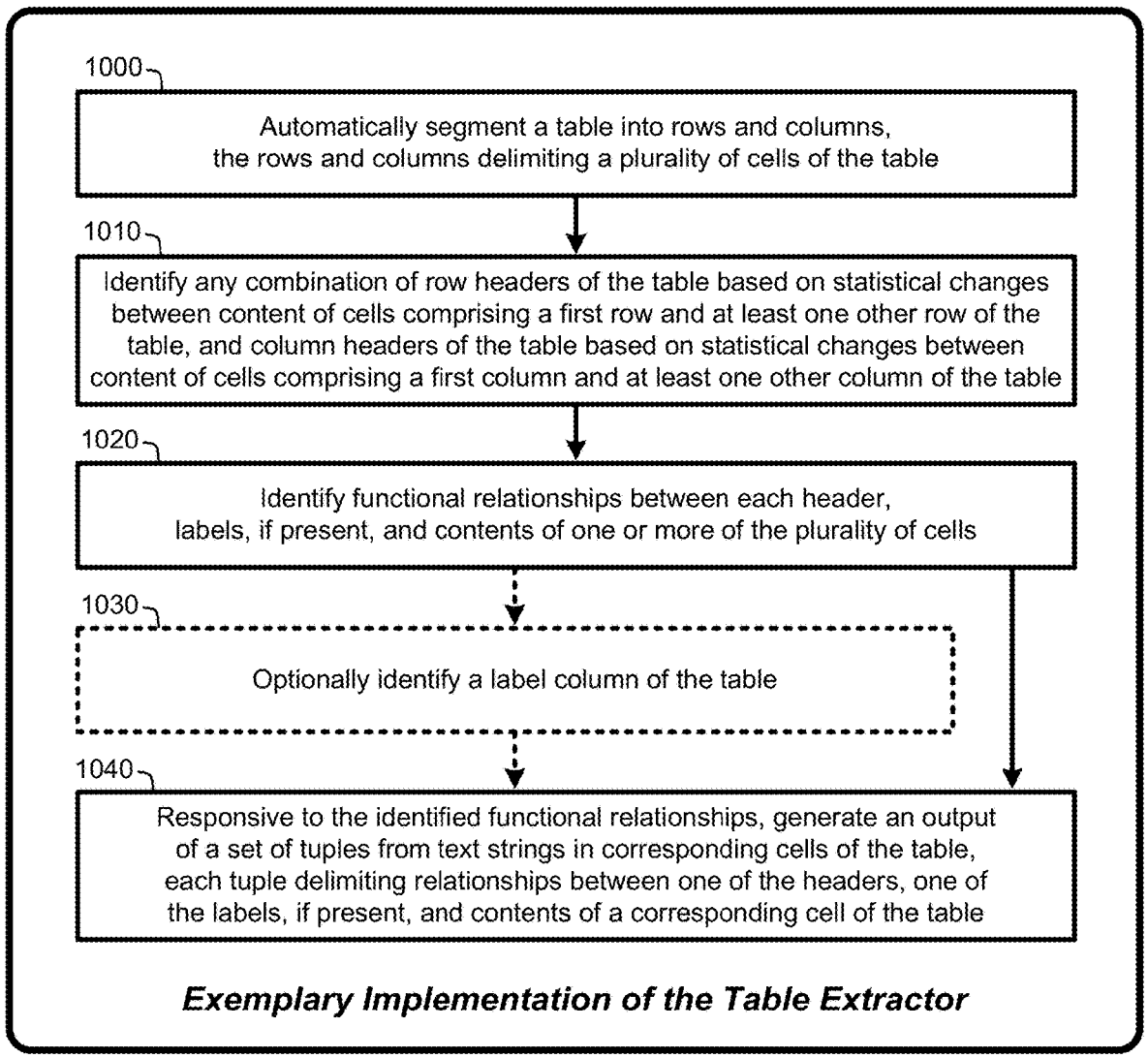
FIG. 10 illustrates a general system flow diagram that illustrates exemplary techniques for effecting various implementations of the Table Extractor, as described herein.
Figure 11:
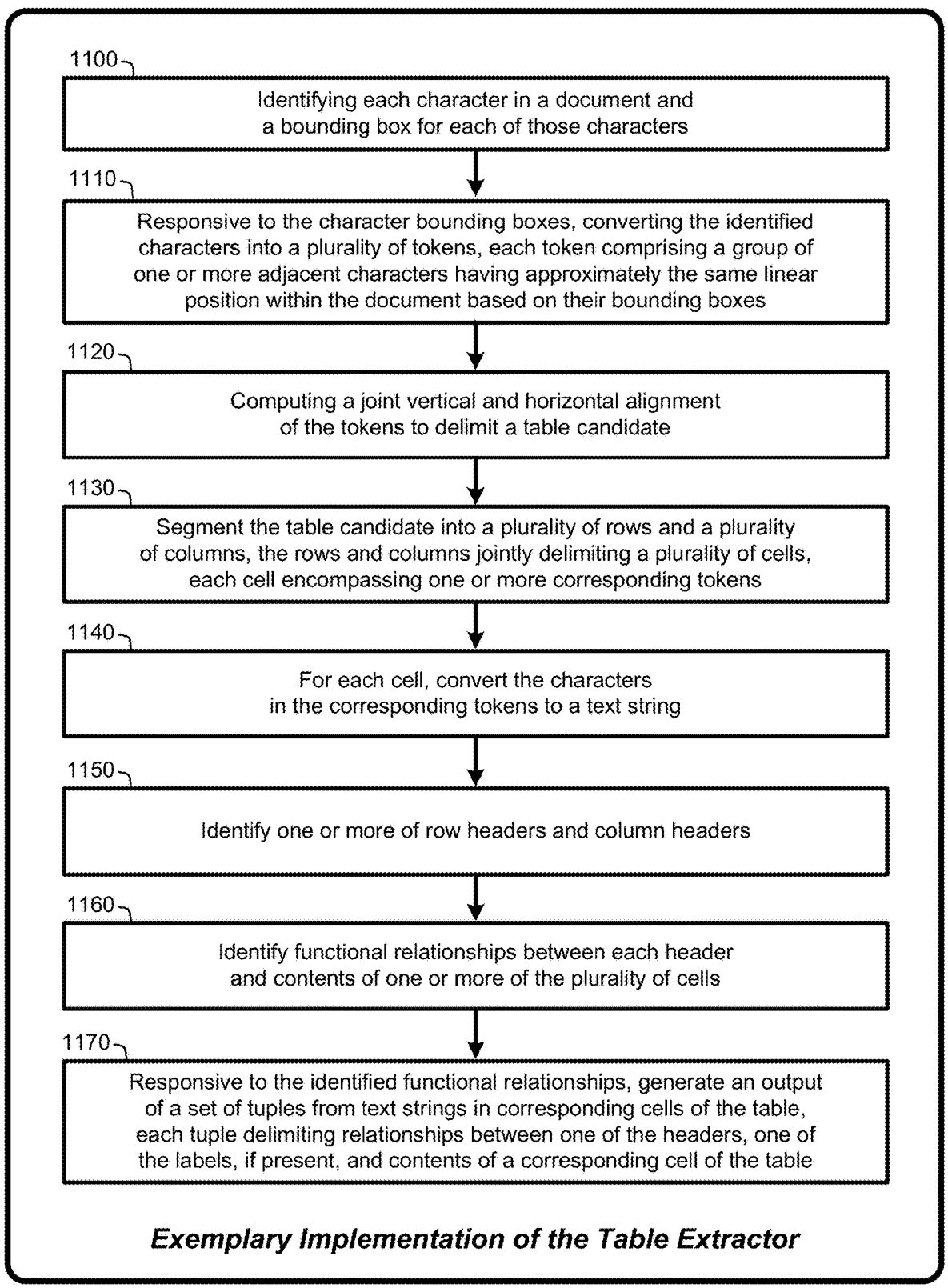
FIG. 11 illustrates a general system flow diagram that illustrates exemplary techniques for effecting various implementations of the Table Extractor, as described herein.

3.0 Operational Summary of the Table Extractor:

The processes described above with respect to FIG. 1 through FIG. 8, and in further view of the detailed description provided above in Sections 1 and 2, are illustrated by the general operational flow diagrams of FIG. 9 through FIG. 11. In particular, FIG. 9 through FIG. 11 provide exemplary operational flow diagrams that summarize the operation of some of the various implementations of the Table Extractor. FIG. 9 through FIG. 11 are not intended to provide an exhaustive representation of all of the various implementations of the Table Extractor described herein, and the implementations represented in these figures are provided only for purposes of explanation.

Further, any boxes and interconnections between boxes that may be represented by broken or dashed lines in FIG. 9 through FIG. 11 represent optional or alternate implementations of the Table Extractor described herein, and any or all of these optional or alternate implementations, as described below, may be used in combination with other alternate implementations that are described throughout this document.

In general, as illustrated by FIG. 9, in various implementations, the Table Extractor begins operation by applying a computer to identify (900) any row headers of a table as a function of statistical changes between content of cells comprising the first two rows of a table. Next, the Table Extractor identifies (910) any column headers of the table as a function of statistical changes between content of cells comprising a first column and at least one other column of the table. The Table Extractor then optionally identifies (920) a label column of the table. Next, the Table Extractor identifies (930) functional relationships between each header, labels, if present, and contents of one or more of the plurality of cells. Finally, in various implementations, responsive to the identified functional relationships, the Table Extractor generates (940) an output of a set of tuples from text strings in corresponding cells of the table, each tuple delimiting relationships between one of the headers, one of the labels, if present, and contents of a corresponding cell of the table.

Similarly, as illustrated by FIG. 10, in various implementations, the Table Extractor begins operation by automatically segmenting (1000) a table into rows and columns, the rows and columns delimiting a plurality of cells of the table. Next, in various implementations, the Table Extractor identifies (1010) any combination of row headers of the table based on statistical changes between content of cells comprising a first row and at least one other row of the table, and column headers of the table based on statistical changes between content of cells comprising a first column and at least one other column of the table. The Table Extractor then identifies (1020) functional relationships between each header, labels, if present, and contents of one or more of the plurality of cells. In various implementations, the Table Extractor then optionally identifies (1030) a label column of the table. Finally, in various implementations, responsive to the identified functional relationships, the Table Extractor generates (1040) an output of a set of tuples from text strings in corresponding cells of the table, each tuple delimiting relationships between one of the headers, one of the labels, if present, and contents of a corresponding cell of the table.

Similarly, as illustrated by FIG. 11, in various implementations, the Table Extractor begins operation by identifying (1100) each character in a document and a bounding box for each of those characters. Next, responsive to the character bounding boxes, in various implementations, the Table Extractor converts (1110) the identified characters into a plurality of tokens, each token comprising a group of one or more adjacent characters having approximately the same linear position within the document based on their bounding boxes. In various implementations, the Table Extractor then computes (1120) a joint vertical and horizontal alignment of the tokens to delimit a table candidate.

The Table Extractor then segments (1130) the table candidate into a plurality of rows and a plurality of columns, the rows and columns jointly delimiting a plurality of cells, each cell encompassing one or more corresponding tokens. Then, for each cell, the Table Extractor converts (1140) the characters in the corresponding tokens to a text string. The Table Extractor then identifies (1150) one or more of row headers and column headers. Given these headers, the Table Extractor then identifies (1160) functional relationships between each header and one or more of the plurality of cells. Finally, in various implementations, responsive to the identified functional relationships, the Table Extractor generates (1170) an output of a set of tuples from text strings in corresponding cells of the table, each tuple delimiting relationships between one of the headers, one of the labels, if present, and contents of a corresponding cell of the table 4.0 Exemplary Implementations of the Table Extractor:

The following paragraphs summarize various examples of implementations that may be claimed in the present document. The implementations summarized below are not intended to limit the subject matter that may be claimed in view of the detailed description of the Table Extractor. Further, any or all of the implementations summarized below may be claimed in any desired combination with some or all of the implementations described throughout the detailed description and any implementations illustrated in one or more of the figures, and any other implementations and examples described below. The following implementations and examples are intended to be understood in view of the detailed description and figures described throughout this document.

In various implementations, a Table Extractor is implemented by means, processes or techniques for automatically delimiting and extracting tables from arbitrary documents, and then generating functional relationships on those tables in the form of tuples that are suitable for generating query responses via any of a variety of NLP-based techniques.

As a first example, in various implementations, the Table Extractor is implemented via means, processes or techniques that begin operation by identifying any row headers of a table as a function of statistical changes between content of cells comprising a first row and at least one other row of a table. In addition, the Table Extractor identifies any column headers of the table as a function of statistical changes between content of cells comprising any of a first column and at least one other column of the table or a last column and at least one other column of the table. In various implementations, the Table Extractor then continues by identifying functional relationships between each header, labels if present, and contents of one or more of the plurality of cells. Finally, responsive to the identified functional relationships, in various implementations, the Table Extractor continues by generating an output of a set of tuples from text strings in corresponding cells of the table, each tuple delimiting relationships between one of the headers, one of the labels, if present, and contents of a corresponding cell of the table.

As a second example, in various implementations, the first example is further modified via means, processes or techniques wherein the Table Extractor automatically extracts the table from an arbitrary document.

As a third example, in various implementations, the second example is further modified via means, processes or techniques wherein the Table Extractor automatically extracts the table from an arbitrary document by automatically segmenting the extracted table into the rows and columns, the rows and columns jointly delimiting the cells of the table.

As a fourth example, in various implementations, the third example is further modified via means, processes or techniques wherein automatically segmenting the table into rows and columns further comprises converting characters in the arbitrary document into a plurality of tokens based on a positional bounding box associated with each character, each token comprising a group of one or more adjacent characters having approximately the same linear position within the arbitrary document. In various implementations Table Extractor then computes a plurality of joint vertical and horizontal alignments of the tokens and a corresponding presumptive maximum number of tokens for each of the joint alignments. Next, in various implementations, the Table Extractor then generates a corresponding table candidate for each of the joint alignments. In various implementations, the Table Extractor then selects one of the table candidates having a highest number of tokens. Finally, in various implementations, the Table Extractor then segments the selected table candidate into rows and columns.

As a fifth example, in various implementations, the third example is further modified via means, processes or techniques wherein automatically segmenting the table into rows and columns further comprises identifying each character in the arbitrary document and a bounding box for each of those characters. In addition, in various implementations, responsive to the character bounding boxes, the Table Extractor converts the identified characters into a plurality of tokens. Each of these tokens comprising a group of one or more adjacent characters having approximately the same linear position within the document based on their bounding boxes and less than an adjustable amount of whitespace between the adjacent characters. Next, in various implementations, the Table Extractor then computes a plurality of joint vertical and horizontal alignments of the tokens. In various implementations, the Table Extractor then generates a corresponding table candidate for each of the joint alignments. Next, in various implementations, the Table Extractor then selects one of the table candidates having a highest number of tokens. Finally, in various implementations, the Table Extractor segments the selected table candidate into rows and columns.

As a sixth example, in various implementations, any of the first example, the second example, the third example, the fourth example, and the fifth example are further modified via means, processes or techniques further comprising automatically merging any of one or more rows or one or more columns.

As a seventh example, in various implementations, any of the first example, the second example, the third example, the fourth example, the fifth example, and the sixth example, are further modified via means, processes or techniques further comprising receiving a user query via a user interface and generating a response to the user query by applying natural language processing to match the user query to one or more of the tuples to return the query response.

As an eighth example, in various implementations, the Table Extractor is implemented via means, processes or techniques that begin operation by automatically segmenting a table into rows and columns, the rows and columns delimiting a plurality of cells of the table. Next, in various implementations, the Table Extractor then identifies any combination of row headers of the table based on statistical changes between content of cells comprising a first row and at least one other row of the table, and column headers of the table based on statistical changes between content of cells comprising any of a first column and at least one other column of the table or a last column and at least one other column of the table. In various implementations, the Table Extractor then identifies functional relationships between each header and one or more of the plurality of cells. Finally, in various implementations, responsive to the identified functional relationships, the Table Extractor generates an output of a set of tuples from text strings in corresponding cells of the table, each tuple delimiting relationships between one of the headers and contents of a corresponding cell of the table.

As a ninth example, in various implementations, the eighth example is further modified via means, processes or techniques wherein the Table Extractor automatically extracts the table from an arbitrary document.

As a tenth example, in various implementations, the ninth example is further modified via means, processes or techniques wherein automatically segmenting the table into rows and columns further comprises converting characters in the arbitrary document into a plurality of tokens based on a positional bounding box associated with each character. Each of these tokens comprising a group of one or more adjacent characters having approximately the same linear position within the arbitrary document and less than an adjustable amount of whitespace between the adjacent characters. In addition, in various implementations, the Table Extractor computes a joint vertical and horizontal alignment of the tokens. Finally, in various implementations, the Table Extractor generates the extracted table based on the joint alignment.

As an eleventh example, in various implementations, the tenth example is further modified via means, processes or techniques wherein each cell of the table encompasses one or more corresponding tokens. The Table Extractor then converts the characters of all tokens in each cell into a corresponding text string.

As a twelfth example, in various implementations, any of the ninth example, the tenth example, and the eleventh example are further modified via means, processes or techniques wherein automatically segmenting the table into rows and columns further comprises identifying each character in the arbitrary document and a bounding box for each of those characters. In addition, in various implementations, the Table Extractor, responsive to the character bounding boxes, converts the identified characters into a plurality of tokens, each token comprising a group of one or more adjacent characters having approximately the same linear position within the document based on their bounding boxes and less than an adjustable amount of whitespace between the adjacent characters. Next, in various implementations, the Table Extractor then computes a plurality of joint vertical and horizontal alignments of the tokens. Next, in various implementations, responsive to each of the joint alignments, the Table Extractor the generates a corresponding table candidate. In various implementations, the Table Extractor then selects one of the table candidates having a highest number of tokens. Finally, in various implementations, the Table Extractor segments the selected table candidate into rows and columns.

As a thirteenth example, in various implementations, any of the eighth example, the ninth example, the tenth example, the eleventh example, and the twelfth example are further modified via means, processes or techniques wherein the Table Extractor receives a user query via a user interface and then generates a response to the user query by applying natural language processing to match the user query to one or more of the tuples to return the query response.

As a fourteenth example, in various implementations, any of the eighth example, the ninth example, the tenth example, the eleventh example, the twelfth example and the thirteenth example are further modified via means, processes or techniques wherein the Table Extractor identifies each character in the document and, for each character, determines any combination of font type, font size and character formatting.

As a fifteenth example, in various implementations, the Table Extractor is implemented via means, processes or techniques that begin operation by identifying each character in a document and a bounding box for each of those characters. Next, in various implementations, responsive to the character bounding boxes, the Table Extractor then converts the identified characters into a plurality of tokens. Each of token comprising a group of one or more adjacent characters having approximately the same linear position within the document based on their bounding boxes. In various implementations, the Table Extractor then computes a joint vertical and horizontal alignment of the tokens to delimit a table candidate. In addition, in various implementations, the Table Extractor then segments the table candidate into a plurality of rows and a plurality of columns, the rows and columns jointly delimiting a plurality of cells, each cell encompassing one or more corresponding tokens. Next, in various implementations, the Table Extractor then converts the characters in the corresponding tokens in each cell to a text string. In various implementations, the Table Extractor then identifies one or more of row headers and column headers. Next, in various implementations, the Table Extractor then identifies functional relationships between each header and contents of one or more of the plurality of cells. Finally, in various implementations, responsive to the identified functional relationships, the Table Extractor, generating an output of a set of tuples from text strings in corresponding cells of the table, each tuple delimiting relationships between one of the headers and contents of a corresponding cell of the table.

As a sixteenth example, in various implementations, the fifteenth example is further modified via means, processes or techniques further comprising generating a response to a query on the selected table by applying natural language processing to one or more of the tuples to return the query response.

As a seventeenth example, in various implementations, any of the fifteenth example and the sixteenth example are further modified via means, processes or techniques further comprising, for each of a plurality of points on a page of the document, computing a separate joint vertical and horizontal alignment of the tokens to delimit a corresponding table candidate.

As an eighteenth example, in various implementations, the seventeenth example is further modified via means, processes or techniques further comprising selecting one of the table candidates having a highest presumptive maximum number of tokens as the table candidate that is segmented into the plurality of rows and the plurality of columns.

As a nineteenth example, in various implementations, any of the fifteenth example, the sixteenth example, the seventeenth example, and the eighteenth example are further modified via means, processes or techniques wherein identifying each character in a document further comprises determining any combination of font type, font size, and character formatting.

As a twentieth example, in various implementations, any of the fifteenth example, the sixteenth example, the seventeenth example, the eighteenth example, and the nineteenth example are further modified via means, processes or techniques wherein identifying each character in a document further comprises determining whether any of the characters are superscripts and whether any of the characters are subscripts.

Figure 12:
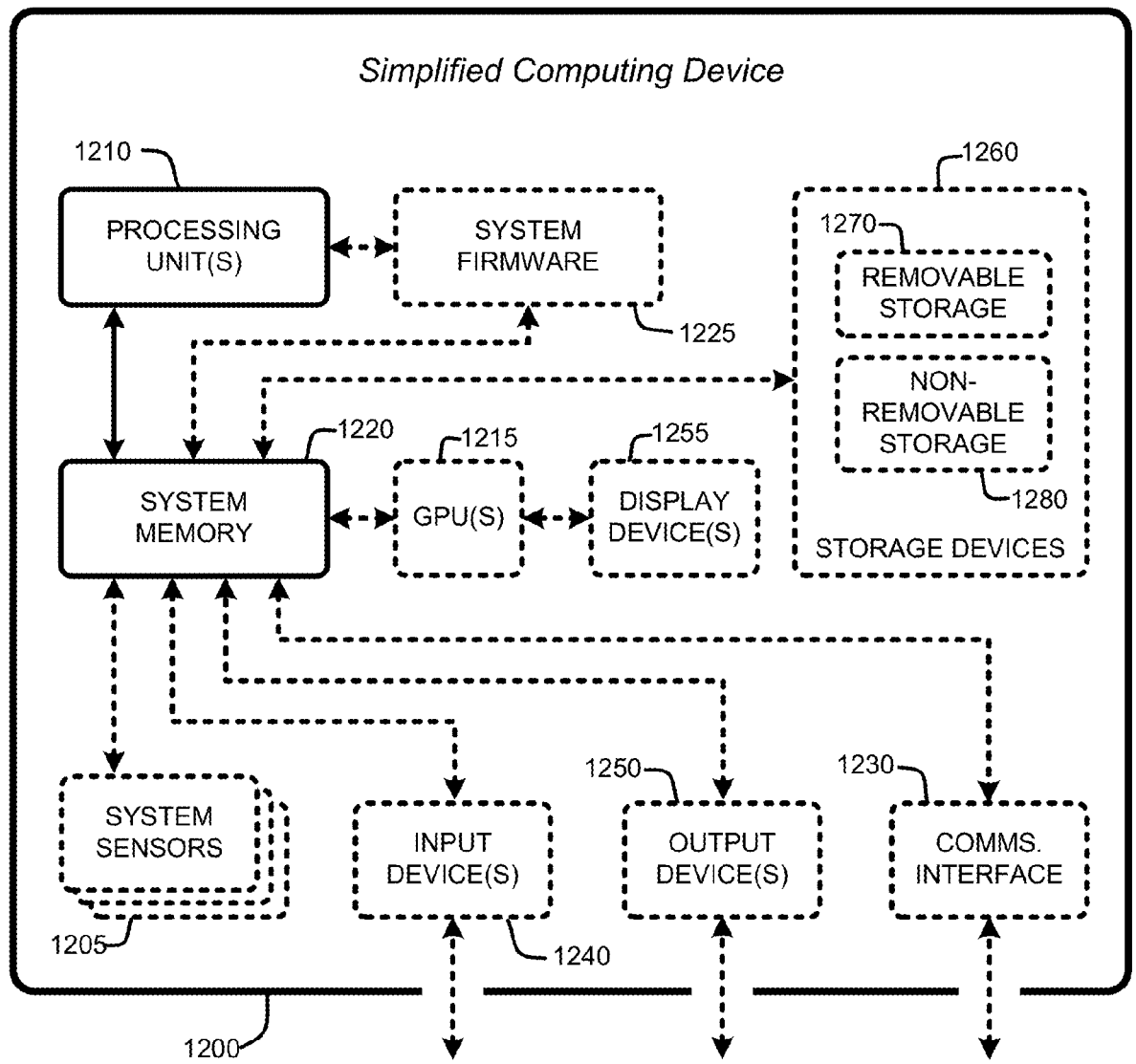
FIG. 12 is a general system diagram depicting a simplified general-purpose computing device having simplified computing and I/O capabilities for use in effecting various implementations of the Table Extractor, as described herein.

5.0 Exemplary Operating Environments:

The Table Extractor implementations described herein are operational within numerous types of general purpose or special purpose computing system environments or configurations. FIG. 12 illustrates a simplified example of a general-purpose computer system on which various implementations and elements of the Table Extractor, as described herein, may be implemented. Any boxes that are represented by broken or dashed lines in the simplified computing device 1200 shown in FIG. 12 represent alternate implementations of the simplified computing device. As described below, any or all of these alternate implementations may be used in combination with other alternate implementations that are described throughout this document.

The simplified computing device 1200 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the Table Extractor implementations described herein, the device should have a sufficient computational capability and system memory to enable basic computational operations. In particular, the computational capability of the simplified computing device 1200 shown in FIG. 12 is generally illustrated by one or more processing unit(s) 1210, and may also include one or more graphics processing units (GPUs) 1215, either or both in communication with system memory 1220. The processing unit(s) 1210 of the simplified computing device 1200 may be specialized microprocessors (such as a digital signal processor (DSP), a very long instruction word (VLIW) processor, a field-programmable gate array (FPGA), or other micro-controller) or can be conventional central processing units (CPUs) having one or more processing cores and that may also include one or more GPU-based cores or other specific-purpose cores in a multi-core processor.

In addition, the simplified computing device 1200 may also include other components, such as, for example, a communications interface 1230. The simplified computing device 1200 may also include one or more conventional computer input devices 1240 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 1200 and with any other component or feature of the Table Extractor, including input, output, control, feedback, and response to one or more users or other devices or systems associated with the Table Extractor, are enabled by a variety of Natural User Interface (NUI) scenarios. The NUI techniques and scenarios enabled by the Table Extractor include, but are not limited to, interface technologies that allow one or more users user to interact with the Table Extractor in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other input devices 1240 or system sensors 1205. Such NUI implementations are also enabled by the use of various techniques including, but not limited to, information derived from system sensors 1205 or other input devices 1240 from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices.

Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited to, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the Table Extractor.

However, the aforementioned exemplary NUI scenarios may be further augmented by combining the use of artificial constraints or additional signals with any combination of NUI inputs. Such artificial constraints or additional signals may be imposed or generated by input devices 1240 such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the Table Extractor.

The simplified computing device 1200 may also include other optional components such as one or more conventional computer output devices 1250 (e.g., display device(s) 1255, audio output devices, video output devices, devices for transmitting wired or wireless data transmissions, and the like). Typical communications interfaces 1230, input devices 1240, output devices 1250, and storage devices 1260 for general-purpose computers are well known to those skilled in the art, and will not be described in detail herein.

The simplified computing device 1200 shown in FIG. 12 may also include a variety of computer-readable media. Computer-readable media can be any available media that can be accessed by the computing device 1200 via storage devices 1260, and include both volatile and nonvolatile media that is either removable 1270 and/or non-removable 1280, for storage of information such as computer-readable or computer-executable instructions, data structures, program modules, or other data.

Computer-readable media includes computer storage media and communication media. Computer storage media refers to tangible computer-readable or machine-readable media or storage devices such as digital versatile disks (DVDs), Blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. The terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various Table Extractor implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware 1225, hardware, or any combination thereof to control a computer to implement the disclosed subject matter. The term "article of manufacture" as used herein is intended to encompass a computer program accessible from any computer-readable device, or media.

The Table Extractor implementations described herein may be further described in the general context of computer-executable instructions, such as program modules, being executed by a computing device. Generally, program modules include routines, programs, objects, components, data structures, and the like, that perform particular tasks or implement particular abstract data types. The Table Extractor implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so on.

6.0 Other Implementations:

The foregoing description of the Table Extractor has been presented for the purposes of illustration and description. It is not intended to be exhaustive or to limit the claimed subject matter to the precise form disclosed. Many modifications and variations are possible in light of the above teaching. Further, any or all of the aforementioned alternate implementations may be used in any combination desired to form additional hybrid implementations of the Table Extractor. It is intended that the scope of the Table Extractor be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of detailed description of the Table Extractor described above.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known to enable such interactions.

What is claimed is:

1. A computer-implemented process comprising using a computer to perform process actions for:
   identifying any headers of a row of headers of a table as a function of inter-row statistical differences between features of content of cells belonging to a first row or a last row and at least one other row of a table,
      wherein at least one header of a row of headers is identified as being present in the table responsive to larger inter-row statistical differences, and
      wherein headers of a row of headers are identified as not being present in the table responsive to smaller inter-row statistical differences;
   identifying any headers of a column of headers of the table as a function of inter-column statistical differences between features of content of cells belonging to a first column or a last column and at least one other column of the table,
      wherein at least one header of a column of headers is identified as being present in the table responsive to larger inter-column statistical differences, and
      wherein headers of a column of headers are identified as not being present in the table responsive to smaller inter-column statistical changes;
   identifying functional relationships between each header and contents of one or more other cells of the table; and
   responsive to the identified functional relationships, generating an output of a set of tuples from text strings in corresponding cells of the table, each tuple delimiting relationships between one of the headers and contents of a corresponding cell of the table;
   wherein the set of tuples indicates for the corresponding cell of the table either:
      a one-variable functional relationship responsive to one of a column of headers or a row of headers being identified as present in the table, or
      a two-variable functional relationship responsive to both of a column of headers and a row of headers being identified as present in the table.

2. The computer-implemented process of claim 1 further comprising process actions for automatically extracting the table from an arbitrary document.

3. The computer-implemented process of claim 2 wherein automatically extracting the table from the arbitrary document further comprises process actions for automatically segmenting the extracted table into the rows and columns, the rows and columns jointly delimiting the cells of the table.

4. The computer-implemented process of claim 3, wherein automatically segmenting the table into rows and columns further comprises process actions for:
   converting characters in the arbitrary document into a plurality of tokens based on a positional bounding box associated with each character, each token comprising a group of one or more adjacent characters having the same linear position within the arbitrary document;
   computing a plurality of joint vertical and horizontal alignments of the tokens and a corresponding maximum number of tokens for each of the joint alignments;
   responsive to each of the joint alignments, generating a corresponding table candidate;
   selecting one of the table candidates having a highest number of tokens; and
   segmenting the selected table candidate into rows and columns.

5. The computer-implemented process of claim 3, wherein automatically segmenting the table into rows and columns further comprises process actions for:
   identifying each character in the arbitrary document and a bounding box for each of those characters;
   responsive to the character bounding boxes, converting the identified characters into a plurality of tokens, each token comprising a group of one or more adjacent characters having the same linear position within the document based on their bounding boxes and less than an adjustable amount of whitespace between the adjacent characters;
   computing a plurality of joint vertical and horizontal alignments of the tokens;
   responsive to each of the joint alignments, generating a corresponding table candidate;
   selecting one of the table candidates having a highest number of tokens; and
   segmenting the selected table candidate into rows and columns.

6. The computer-implemented process of claim 1, further comprising process actions for automatically merging any of one or more rows or one or more columns.

7. The computer-implemented process of claim 1, further comprising process actions for:
   receiving a user query via a user interface; and
   generating a response to the user query by applying natural language processing to match the user query to one or more of the tuples to return a query response.

8. A system, comprising:
   a computing device configured to:
      automatically segment a table into rows and columns, the rows and columns delimiting a plurality of cells of the table;
      identify any headers of a row of headers of the table as a function of inter-row statistical differences between features of content of cells belonging to a first row or a last row and at least one other row of a table,
         wherein at least one header of a row of headers is identified as being present in the table responsive to larger inter-row statistical differences, and
         wherein headers of a row of headers are identified as not being present in the table responsive to smaller inter-row statistical differences;
      identify any headers of a column of headers of the table as a function of inter-column statistical differences between features of content of cells belonging to a first column or a last column and at least one other column of the table,
         wherein at least one header of a column of headers is identified as being present in the table responsive to larger inter-column statistical differences, and
         wherein headers of a column of headers are identified as not being present in the table responsive to smaller inter-column statistical changes;
      identify functional relationships between each header and contents of one or more other cells of the table; and
      responsive to the identified functional relationships, generating an output of a set of tuples from text strings in corresponding cells of the table, each tuple delimiting relationships between one of the headers and contents of a corresponding cell of the table, wherein the set of tuples indicates for the corresponding cell of the table either:
  a one-variable functional relationship responsive to one of a column of headers or a row of headers being identified as present in the table, or
  a two-variable functional relationship responsive to both of a column of headers and a row of headers being identified as present in the table.

9. The system of claim 8, wherein the computing device is further configured to automatically extract the table from an arbitrary document.

10. The system of claim 9, wherein automatically segmenting the table into rows and columns further comprises:
  converting characters in the arbitrary document into a plurality of tokens based on a positional bounding box associated with each character, each token comprising a group of one or more adjacent characters having the same linear position within the arbitrary document and less than an adjustable amount of whitespace between the adjacent characters;
  computing a joint vertical and horizontal alignment of the tokens; and
  generating the extracted table based on the joint alignment.

11. The system of claim 10, each cell of the table encompassing one or more corresponding tokens, wherein the computing device is further configured to convert the characters of all tokens in each cell into a corresponding text string.

12. The system of claim 9, wherein automatically segmenting the table into rows and columns further comprises:
  identifying each character in the arbitrary document and a bounding box for each of those characters;
  responsive to the character bounding boxes, converting the identified characters into a plurality of tokens, each token comprising a group of one or more adjacent characters having the same linear position within the document based on their bounding boxes and less than an adjustable amount of whitespace between the adjacent characters;
  computing a plurality of joint vertical and horizontal alignments of the tokens;
  responsive to each of the joint alignments, generating a corresponding table candidate;
  selecting one of the table candidates having a highest number of tokens; and
  segmenting the selected table candidate into rows and columns.

13. The system of claim 8, wherein the computing device is further configured to:
  receive a user query via a user interface; and
  generate a response to the user query by applying natural language processing to match the user query to one or more of the tuples to return a query response.

14. The system of claim 8, further comprising:
  identifying each character in a document from which the table was extracted; and
  for each character, determining any combination of font type, font size and character formatting.

15. A method performed by a computing system, the method comprising:
  identifying each character in an electronic document and a bounding box for each of those characters;
  responsive to the character bounding boxes, converting the identified characters into a plurality of tokens, each token comprising a group of one or more adjacent characters having the same linear position within the document based on their bounding boxes;
  computing a joint vertical and horizontal alignment of the tokens to delimit a table candidate;
  segmenting the table candidate into a plurality of rows and a plurality of columns defining a table, the rows and columns jointly delimiting a plurality of cells, each cell encompassing one or more corresponding tokens;
  for each cell, converting the characters in the corresponding tokens to a text string;
  identifying any headers of a row of headers of the table as a function of inter-row statistical differences between features of content of cells belonging to a first row or a last row and at least one other row of a table,
    wherein at least one header of a row of headers is identified as being present in the table responsive to larger inter-row statistical differences, and
    wherein headers of a row of headers are identified as not being present in the table responsive to smaller inter-row statistical differences;
  identifying any headers of a column of headers of the table as a function of inter-column statistical differences between features of content of cells belonging to a first column or a last column and at least one other column of the table,
    wherein at least one header of a column of headers is identified as being present in the table responsive to larger inter-column statistical differences, and
    wherein headers of a column of headers are identified as not being present in the table responsive to smaller inter-column statistical changes;
  identifying functional relationships between each header and contents of one or more other cells of the table; and
  responsive to the identified functional relationships, generating an output of a set of tuples from text strings in corresponding cells of the table, each tuple delimiting relationships between one of the headers and contents of a corresponding cell of the table,
    wherein the set of tuples indicates for the corresponding cell of the table either:
      a one-variable functional relationship responsive to one of a column of headers or a row of headers being identified as present in the table, or
      a two-variable functional relationship responsive to both of a column of headers and a row of headers being identified as present in the table.

16. The method of claim 15 further comprising generating a response to a query on the selected table by applying natural language processing to one or more of the tuples to return a query response.

17. The method of claim 15 further comprising, for each of a plurality of points on a page of the document, computing a separate joint vertical and horizontal alignment of the tokens to delimit a corresponding table candidate.

18. The method of claim 17 further comprising selecting one of the table candidates having a highest computed maximum number of tokens as the table candidate that is segmented into the plurality of rows and the plurality of columns.

19. The method of claim 15 wherein identifying each character in the document further comprises determining any combination of font type, font size, and character formatting.

20. The method of claim 15 wherein identifying each character in the document further comprises determining whether any of the characters are superscripts and whether any of the characters are subscripts.

\* \* \* \* \*